(12) United States Patent
Brewer et al.

(10) Patent No.: US 11,283,079 B2
(45) Date of Patent: Mar. 22, 2022

(54) ANODES FOR LITHIUM-BASED ENERGY STORAGE DEVICES

(71) Applicant: Graphenix Development, Inc., Williamsville, NY (US)

(72) Inventors: John C. Brewer, Rochester, NY (US); Kevin Tanzil, Rochester, NY (US); Paul D. Garman, Pittsford, NY (US); Robert G. Anstey, Tonawanda, NY (US)

(73) Assignee: Graphenix Development, Inc., Williamsville, NY (US)

( * ) Notice: Subject to any disclaimer, the term of this patent is extended or adjusted under 35 U.S.C. 154(b) by 0 days.

(21) Appl. No.: 17/109,872

(22) Filed: Dec. 2, 2020

(65) Prior Publication Data
US 2021/0119217 A1    Apr. 22, 2021

Related U.S. Application Data

(63) Continuation of application No. 16/285,842, filed on Feb. 26, 2019, now Pat. No. 10,910,653.
(Continued)

(51) Int. Cl.
*H01M 4/66* (2006.01)
*H01M 10/0525* (2010.01)
(Continued)

(52) U.S. Cl.
CPC ......... *H01M 4/661* (2013.01); *H01M 4/0404* (2013.01); *H01M 4/0428* (2013.01);
(Continued)

(58) Field of Classification Search
CPC ...... H01M 4/661; H01M 4/626; H01M 4/386; H01M 4/131; H01M 4/0428; H01M 10/0525; H01M 4/1391; H01M 2004/027
See application file for complete search history.

(56) References Cited

U.S. PATENT DOCUMENTS

| 6,761,744 B1 | 7/2004 | Tsukamoto et al. |
| 7,378,041 B2 | 5/2008 | Asao et al. |

(Continued)

FOREIGN PATENT DOCUMENTS

| WO | 2013012334 A1 | 1/2013 |
| WO | 2015175509 A1 | 11/2015 |

(Continued)

OTHER PUBLICATIONS

International Application No. PCT/US2021/026179 received an International Search Report and Written Opinion dated Jul. 9, 2021, 9 pages.

(Continued)

*Primary Examiner* — Stewart A Fraser
(74) *Attorney, Agent, or Firm* — Kilpatrick Townsend & Stockton LLP

(57) ABSTRACT

An anode for a lithium-based energy storage device such as a lithium-ion battery is disclosed. The anode includes an electrically conductive current collector comprising an electrically conductive layer and a transition metal oxide layer overlaying the electrically conductive layer. The anode may include a continuous porous lithium storage layer provided over the transition metal oxide layer. The continuous porous lithium storage layer may include at least 40 atomic % silicon. A method of making the anode may include providing an electrically conductive current collector having an electrically conductive layer and a transition metal oxide layer provided over the electrically conductive layer. The transition metal oxide layer may have an average thickness of at least 0.05 μm. A continuous porous lithium storage layer is deposited over the transition metal oxide layer by PECVD.

19 Claims, 16 Drawing Sheets

Related U.S. Application Data

(60) Provisional application No. 62/635,290, filed on Feb. 26, 2018.

(51) Int. Cl.

| | |
|---|---|
| H01M 4/134 | (2010.01) |
| H01M 4/62 | (2006.01) |
| H01M 4/38 | (2006.01) |
| H01M 4/131 | (2010.01) |
| H01M 4/04 | (2006.01) |
| H01M 4/1391 | (2010.01) |
| H01M 4/1395 | (2010.01) |
| H01M 4/02 | (2006.01) |

(52) U.S. Cl.
CPC ......... *H01M 4/0442* (2013.01); *H01M 4/131* (2013.01); *H01M 4/134* (2013.01); *H01M 4/1391* (2013.01); *H01M 4/1395* (2013.01); *H01M 4/386* (2013.01); *H01M 4/626* (2013.01); *H01M 4/667* (2013.01); *H01M 4/669* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 7,767,341 | B2 | 8/2010 | Kogetsu et al. |
| 8,257,866 | B2 | 9/2012 | Loveness et al. |
| 8,906,523 | B2 | 12/2014 | Brantner |
| 9,281,515 | B2 | 3/2016 | Nazri |
| 9,293,771 | B2 | 3/2016 | Tani et al. |
| 9,325,014 | B2 | 4/2016 | Lee et al. |
| 10,014,552 | B1 | 7/2018 | Shnitser et al. |
| 10,115,960 | B2 | 10/2018 | Lee et al. |
| 10,164,252 | B2 | 12/2018 | Yang et al. |
| 10,686,214 | B2 | 6/2020 | Liu et al. |
| 10,910,653 | B2 | 2/2021 | Brewer |
| 2004/0191630 | A1 | 9/2004 | Kawamura |
| 2005/0031958 | A1 | 2/2005 | Fukuoka et al. |
| 2006/0216604 | A1 | 9/2006 | Kawase et al. |
| 2007/0207381 | A1 | 9/2007 | Ohtsuka et al. |
| 2009/0162750 | A1 | 6/2009 | Kawakami |
| 2010/0297502 | A1 | 2/2010 | Zhu et al. |
| 2010/0216026 | A1 | 8/2010 | Lopatin et al. |
| 2010/0285358 | A1 | 11/2010 | Cui et al. |
| 2011/0111304 | A1 | 5/2011 | Cui et al. |
| 2011/0114254 | A1 | 5/2011 | Xu et al. |
| 2011/0159365 | A1 | 6/2011 | Loveness et al. |
| 2011/0266654 | A1 | 11/2011 | Kuriki et al. |
| 2012/0121983 | A1 | 5/2012 | Yoon et al. |
| 2013/0143124 | A1 | 6/2013 | Lee et al. |
| 2014/0011088 | A1* | 1/2014 | Lopatin ............... H01M 4/0404 429/211 |
| 2014/0248543 | A1* | 9/2014 | Zhu ....................... H01M 4/045 429/338 |
| 2015/0118572 | A1 | 4/2015 | Lund et al. |
| 2015/0325852 | A1 | 11/2015 | Wang et al. |
| 2017/0133662 | A1 | 5/2017 | Cui et al. |
| 2017/0279163 | A1 | 9/2017 | Jang et al. |
| 2017/0301616 | A1 | 10/2017 | Biederman et al. |
| 2017/0335482 | A1 | 11/2017 | Date et al. |
| 2018/0083264 | A1 | 3/2018 | Soppe |
| 2018/0123132 | A1 | 6/2018 | Kawakami et al. |
| 2018/0287130 | A1 | 10/2018 | de Souza et al. |
| 2019/0103231 | A1 | 4/2019 | Chai et al. |
| 2019/0140267 | A1 | 5/2019 | Gopalakrishnan Nair et al. |
| 2019/0207205 | A1 | 7/2019 | Adair et al. |
| 2019/0267361 | A1 | 8/2019 | Brewer et al. |
| 2019/0267631 | A1 | 8/2019 | Brewer et al. |
| 2020/0411851 | A1 | 12/2020 | O'Toole et al. |

FOREIGN PATENT DOCUMENTS

| | | |
|---|---|---|
| WO | 2016112333 A1 | 7/2016 |
| WO | 2019165412 A1 | 8/2019 |
| WO | 2021029769 A | 2/2021 |

OTHER PUBLICATIONS

Beattie, Understanding capacity fade in silicon based electrodes for lithium-ion batteries using three electrode cells and upper cut-off voltage studies, Science Direct, Journal of Power Sources, 2016, vol. 302, 426-430, Elsevier.

Cho, Electrochemical Properties of Si Film Electrodes Grown on Current Collectors with CuO Nanostructures for Thin-Film Microbatteries, American Scientific Publishers, 2014, vol. 14, 9300-9306, Journal of Nanoscience and Nanotechnology.

Cho, Enhanced Lithium Ion battery Cycling of Silicon Nanowire Anodes by Template Growth to Eliminate Silicon Underlayer Islands, NANO Letters, 2013, vol. 13, 5740-5747.

Corte, Effets du traitement chimique de la surface d'une, Ecole Polytechnique Paris Tech, Oct. 2013, 1-139.

Domi, et al., "Effect of Mechanical Pre-Lithiation on Electrochemical Performance of Silicon Negative Electrode for Lithium-Ion Batteries", J. Electrochem. Soc. 164(7) pp. A1651-A1654, Jun. 2017.

Gomez-Baquero, Silicon Anodes to Enable Better Lithium Ion Batteries, ResearchGate, Apr. 2016, 1-28, Besstech, LLC.

Gonzalez, Optimal Conditions for Fast Charging and Long Cycling Stability of Silicon Microwire Anodes for Lithium Ion Batteries, and Comparison with the Performance of other Si Anode Concepts, Energies, 2013, vol. 6, 5145-5156.

Holstiege et al., "Pre-Lithiation Strategies for Rechargeable Energy Storage Technologies: Concepts, Promises and Challenges", Batteries, Jan. 2018, 39 pages.

Kim, Electrochemical characteristics of Si/Mo multilayer anode for Li ion batteries, Revista Mexicana De Fisica S53, 2007, 17-20.

Li, One-step synthesis of Li-doped NiO as high-performance anode material for lithium ion batteries, Ceramics International, 2016, vol. 42, 14565-14572, Elsevier.

Lin, Optical Characterization of Hydrogenated Amorphous Silicon Thin Films Deposited at High Rate, Journal of Electronic Materials, 1999, vol. 28, No. 12, 1452-1456.

Nomi Nanda, et al., "Process and Material Properties of PECVD Boron-Doped Amorphous Silicon Film", https://www.electrochem.org/dl/ma/201/pdfs/0399.pdf (pub date unknown), 1 page.

Notten, Advanced Energy Storage Materials for Battery Applications, Advanced Materials, Dec. 12, 2012, 1-50, NL Agency Ministry of Economic Affairs, Agriculture and Innovation.

Sakabe, et al., Porous amorphous silicon film anodes for highcapacity and stable all-solid-state lithium batteries Communications Chemistry (2018)1 :24.

Salah, Pure silicon thin-film anodes for lithium-ion batters: A review, Journal of Power Sources, 2019, vol. 414, 48-67, Elsevier.

Soppe, Self-Organized Nano-Structures Silicon as Anode Material for Li-Ion Batteries, Meeting of Materials Research Society, Apr. 2-6, 2018, 1 page, Phoenix, Arizona.

Stefan; Ionel, "A Commercially Scalable Process for Silicon Anode Prelithiation", Amprius Inc, DOE Merit Review, Jun. 6-10, 2016, Project ES250 https://www.energy.gov/sites/prod/files/2016/06/f32/es250_stefan_2016_o_ web. pdf, 23 pages.

Sun, Nanomembranes Based on Nickel Oxide and Germanium as Anode Materials for Lithium-Ion Batteries, Dissertation, May 10, 2017, China.

Uehara, Thick vacuum deposited silicon films suitable for the anode of Li-ion battery, Journal of Power Sources, 2005 vol. 146, 441-444, Science Direct.

Ulvestad, et al., "Silicon Nitride Coated Silicon Thin Films as Anodes for Li-Ion Batteries:", ECS Transactions, 64 (22) 107-111, Apr. 2015.

Ulvestad, et al., "Silicon nitride as anode material for Li-ion batteries: Understanding the SiNx conversion Yeaction", J. Power Sources 399, Aug. 2018 414-421.

(56) References Cited

OTHER PUBLICATIONS

Valladares, Characterization of Ni thin films following thermal oxidation in air, Journal of Science Technology, B, vol. 32, Sep./Oct. 2014.

Wu et al., "Silicon nitride coated silicon thin film on three dimensions current collector for lithium ion battery anode", J. Power Sources 325, Jun. 2016, pp. 64-70.

Xu et al., A high-performance Li-ion anode from direct deposition of Si nanoparticles, Nano Energy 38 (2017) 477-485.

Xu et al., A High-performance Li-ion Anode from Direct Deposition of Si Nanoparticles.

Xu et al., Engineering the Direct Deposition of Si Nanoparticles for Improved Performance in Li-Ion Batteries, Journal of the Electrochemical Society, 166 (3) A5252-A5258 (2019).

Yang; Jinho,"Development of Silicon-Based Anodes and In-Situ Characterization Techniques for Lithium Ion Batteries", Jinho Yang Dissertation, Wayne State Univ, Jan. 2014, 125 pages.

Zhao, et al., "A general prelithiation approach for group IV elements and corresponding oxides", Energy Storage Materials Jun. 2017, 7 pages.

International Application No. PCT/US2019/019531 received an International Preliminary Report on Patentability dated Sep. 3, 2020, 8 pages.

International Application No. PCT/US2020/045963 received an Invitation to Pay Additional Fees and, Where Applicable, dated Oct. 19, 2020, 2 pages.

International Application No. PCT/US2020/045963 received an International Search Report and Written Opinion dated Dec. 29, 2020, 12 pages.

\* cited by examiner

Comparative 1 Anode – SEM and corresponding EDS analysis at various spots

Example 1 Anode – SEM and corresponding EDS analysis at various spots

Example 2 Anode— SEM and corresponding EDS analysis at various spots

ANODES FOR LITHIUM-BASED ENERGY STORAGE DEVICES

CROSS-REFERENCE TO RELATED APPLICATIONS

This application is a continuation of U.S. patent application Ser. No. 16/285,842, filed Feb. 26, 2019, and claims the benefit of priority to U.S. Provisional Patent Application Ser. No. 62/635,290, filed Feb. 26, 2018, both of which are incorporated by reference herein in their entirety.

TECHNICAL FIELD

The present disclosure relates to lithium ion batteries and related energy storage devices.

BACKGROUND

Silicon has been proposed as a potential material for lithium-ion batteries to replace the conventional carbon-based anodes which has a storage capacity that is limited to ~370 mAh/g. Silicon readily alloys with lithium and has a much higher theoretical storage capacity (~3600 to 4200 mAh/g at room temperature) than carbon anodes. However, insertion and extraction of lithium into the silicon matrix causes significant volume expansion (>300%) and contraction. This can result in rapid pulverization of the silicon into small particles and electrical disconnection from the current collector.

The industry has recently turned its attention to nano- or micro-structured silicon to reduce the pulverization problem, i.e., silicon in the form of spaced apart nano- or microwires, tubes, pillars, particles and the like. The theory is that making the structures nano-sized avoids crack propagation and spacing them apart allows more room for volume expansion, thereby enabling the silicon to absorb lithium with reduced stresses and improved stability compared to, for example, macroscopic layers of bulk silicon.

Despite research into structured silicon approaches, such batteries based solely on silicon have yet to make a large market impact due to unresolved problems. A significant issue is the manufacturing complexity and investment required to form these anodes. For example, US20150325852 discloses silicon made by first growing a silicon-based, non-conformal, porous layer on a nanowire template by plasma-enhanced chemical vapor deposition (PECVD) followed by deposition of a denser, conformal silicon layer using thermal chemical vapor deposition (CVD). Formation of silicon nanowires can be very sensitive to small perturbations in deposition conditions making quality control and reproducibility a challenge. Other methods for forming nano- or micro-structured silicon use etching of silicon wafers, which is time-consuming and wasteful. Further, the connection between silicon wires to a current collector is inherently fragile and the structures 5 are prone to break or abrade away when subjected to handling stresses needed to manufacture a battery.

SUMMARY

There remains a need for anodes for lithium-based energy storage devices such as Liion batteries that are easy to manufacture, robust to handling, high in charge capacity and amenable to fast charging.

In accordance with an embodiment of this disclosure, an anode for an energy storage device is provided that includes an electrically conductive current collector having a metal oxide layer. A continuous porous lithium storage layer is provided over the metal oxide layer, the continuous porous lithium storage layer including at least 40 atomic % silicon, germanium or a combination thereof. In some embodiments the anode includes less than 10 atomic % carbon. In some embodiments, the anode is substantially free of nanowires, nanopillars and nanotubes. In some embodiments, the anode includes less than 5% by weight of carbon-based binders, graphitic carbon, graphene, graphene oxide, carbon black and conductive carbon. In accordance with another embodiment of this disclosure, a method of forming an anode for use in an energy storage device includes providing an electrically conductive current collector having an electrically conductive layer and a metal oxide layer provided over the electrically conductive layer, wherein the metal oxide layer has an average thickness of at least 0.05 µm. A continuous porous lithium storage layer is deposited onto the metal oxide layer by PECVD, the continuous porous lithium storage layer including at least 40 atomic % silicon, germanium or a combination thereof.

The present disclosure provides anodes for energy storage devices that may have one or more of the following advantages relative to conventional anodes: improved stability at aggressive >1C charging rates; higher overall areal charge capacity; higher charge capacity per gram of silicon; improved physical durability; simplified manufacturing process; and more reproducible manufacturing process.

DETAILED DESCRIPTION

It is to be understood that the drawings are for purposes of illustrating the concepts of the disclosure and may not be to scale.

Anode Overview

Figure 1:
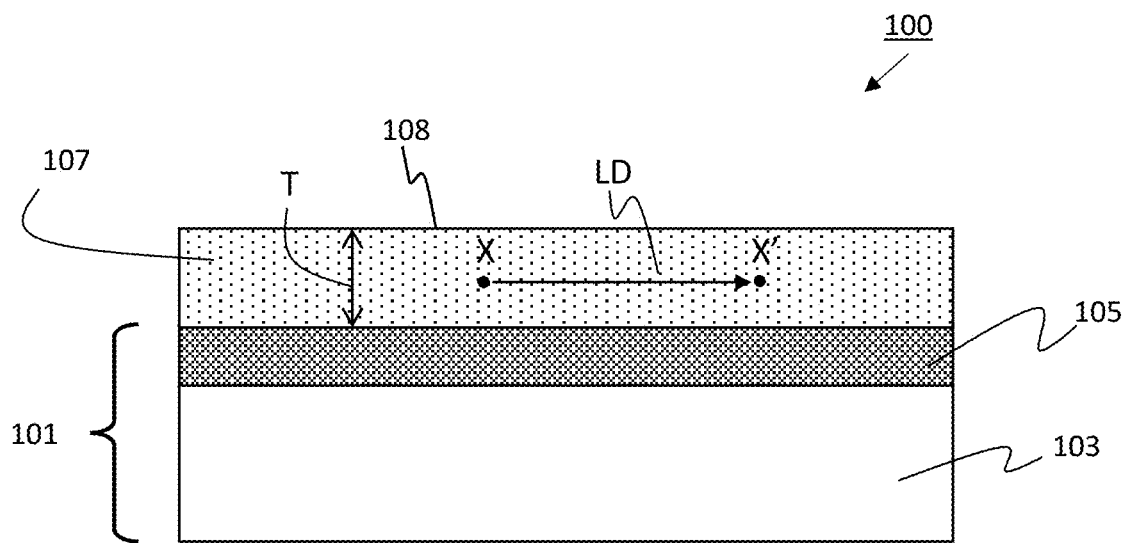
FIG. 1 is a cross-sectional view of an anode according to an embodiment of the present disclosure.

FIG. 1 is a cross-sectional view according to some embodiments of the present disclosure. Anode 100 includes an electrically conductive current collector 101 and a continuous porous lithium storage layer 107. In this embodiment, the electrically conductive current collector 101 includes a metal oxide layer 105 provided over an electrically conductive layer 103. The continuous porous lithium storage layer 107 is provided over metal oxide layer 105. In some embodiments, the top of the continuous porous lithium storage layer 107 corresponds to a top surface 108 of anode 100. In some embodiments the continuous porous lithium storage layer 107 is in physical contact with the metal oxide layer. In some embodiments, the active material of the continuous porous lithium storage layer may extend into the metal oxide layer. In some embodiments the continuous porous lithium storage layer includes a material capable of forming an electrochemically reversible alloy with lithium. In some embodiments, the continuous porous lithium storage layer includes silicon, germanium or alloys thereof. In some embodiments the continuous porous lithium storage layer comprises at least 40 atomic % silicon, germanium or a combination thereof. In some embodiments, the continuous porous lithium storage layer is provided by chemical vapor deposition (CVD) including, but not limited to, hot-wire CVD or plasma-enhanced chemical vapor deposition (PECVD).

Figure 2:
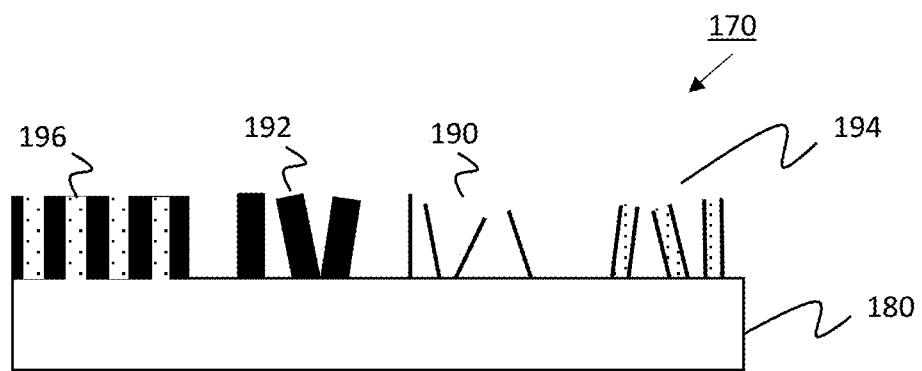
FIG. 2 is a cross-sectional view of a prior art anode.

In the present disclosure, the continuous porous lithium storage layer is substantially free of nanostructures, e.g., in the form of spaced-apart wires, pillars, tubes or the like, or in the form of linear vertical channels extending through the lithium storage layer. FIG. 2 shows a cross-sectional view of a prior art anode 170 that includes some non-limiting examples of nanostructures, such as nanowires 190, nanopillars 192, nanotubes 194 and nanochannels 196 provided over a current collector 180. The term "nanostructure" herein generally refers to an active material structure (for example, a structure of silicon, germanium or their alloys) having at least one cross-sectional dimension that is less than about 2,000 nm, other than a dimension approximately normal to an underlying substrate (such as a layer thickness) and excluding dimensions caused by random pores. Similarly, the terms "nanowires", "nanopillars" and "nanotubes" refers to wires, pillars and tubes, respectively, at least a portion of which, have a diameter of less than 2,000 nm. In some embodiments, the continuous porous lithium storage layer is considered "substantially free" of nanostructures when the anode has an average of fewer than 10 nanostructures per 1600 square microns (in which the number of nanostructures is the sum of the number of nanowires, nanopillars, and nanotubes in the same unit area), such nanostructures having an aspect ratio of 3:1 or higher and being aligned greater than or equal to 45 degrees to the underlying surface. Alternatively, there is an average of fewer than 1 such nanostructures per 1600 square micrometers.

In some embodiments, deposition conditions are selected in combination with the metal oxide so that the continuous porous lithium storage layer is relatively smooth providing an anode with diffuse or total reflectance of at least 10% at 550 nm, alternatively at least 20% (measured at the continuous porous lithium storage layer side). In some embodiments, the continuous porous lithium storage layer is relatively smooth providing an anode where the ratio of total to diffuse reflectance is greater than or equal to 1.05 at 550 nm wavelength measured at a side of the anode having the continuous porous lithium storage layer, alternatively greater than or equal to 1.05 over the 300-800 nm wavelength range measured at the continuous porous lithium storage layer side, alternatively wherein such ratio is greater than 1.1 at 550 nm, alternatively greater than 1.15 at 550 nm. In some embodiments, the anode may have lower reflectance than cited above, for example, by providing a current collector having a rough surface or by modifying deposition conditions of the lithium storage layer.

The anode can be a continuous foil or sheet but can alternatively be a mesh or have some other 3-dimensional structure. In some embodiments, the anode is flexible.

Figure 3:
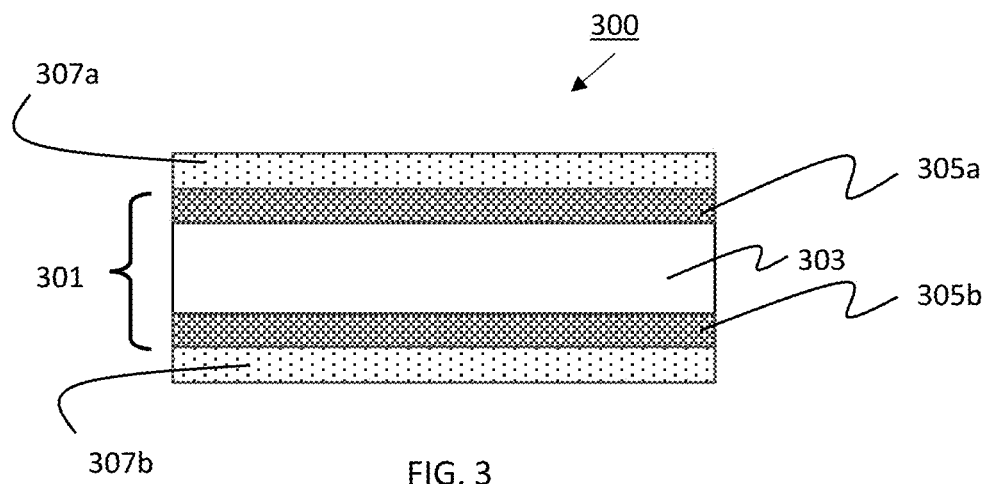
FIG. 3 is a cross-sectional view of an anode according to another embodiment of the present disclosure.
Figure 4:
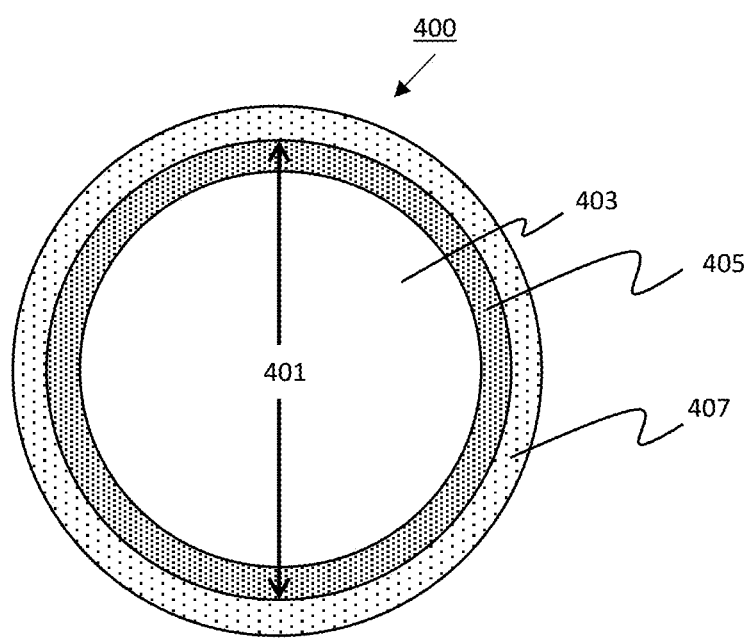
FIG. 4 is a cross-sectional view of an anode according to another embodiment of the present disclosure.

In some embodiments as shown in FIG. 3, the current collector 301 includes electrically conductive layer 303 and metal oxide layers (305a, 305b) deposited on either side of the electrically conductive layer 303 and continuous porous lithium storage layers (307a, 307b) are disposed on both sides to form anode 300. Metal oxide layers 305a and 305b may be the same or different with respect to composition, thickness, porosity or some other property. Similarly, continuous porous lithium storage layers 307a and 307b may be the same or different with respect to composition, thickness, porosity or some other property. In some embodiments, the current collector has a mesh structure and a representative cross section is shown in FIG. 4. Current collector 401 includes metal oxide layer 405 10 substantially surrounding the inner, electrically conductive core 403, e.g., a wire forming part of the mesh, the core acting as an electrically conductive layer. A continuous porous lithium storage layer 407 is provided over the metal oxide layer to form anode 400. The mesh can be formed from interwoven wires or ribbons, formed by patterning holes into a substrate, e.g., a metal or metal-coated sheet, or any suitable method known in the art.

Current Collector

Current collector (101, 301, 401) includes at least one metal oxide layer (105, 305, 405), and may further include a separate electrically conductive layer (103, 303, 403). The metal oxide may be stoichiometric or non-stoichiometric. The metal oxide layer may include a mixture of metal oxides having homogeneously or heterogeneously distributed oxide stoichiometries, mixtures of metals or both. If the metal oxide layer (105, 305, 405) has sufficient electrical conductivity to function as a current collector, the separate electrically conductive layer (103, 303, 403) is optional. In embodiments using an electrically conductive layer, the metal oxide layer should be electrically conductive (e.g., is at least semi-conducting or non-insulating) and allow transfer of electrical charge between the electrically conductive layer and the continuous porous lithium storage layer. The metal oxide layer may include dopants or regions of unoxidized metal that promote electrical conductivity. In some embodiments the electrically conductive layer may have a conductivity of at least 103 S/m, or alternatively at least 106 S/m, or alternatively at least 107 S/m, and may include inorganic or organic conductive materials or a combination thereof. In some embodiments, the electrically 30 conductive layer includes a metallic material, e.g., titanium (and its alloys), nickel (and its alloys), copper (and its alloys), or stainless steel. In some embodiments the electrically conductive layer may be in the form of a foil or sheet of conductive material, or alternatively a layer deposited onto an insulating substrate.

In some embodiments, the metal oxide layer includes a transition metal oxide, e.g., an oxide of nickel, titanium or copper. As mentioned, the metal oxide layer may include mixtures of metals. For example, an "oxide of nickel" may optionally include other metals in addition to nickel. In some embodiments, the metal oxide layer has an average thickness of at least 0.020 µm, alternatively at least 0.050 µm, alternatively 0.1 µm, alternatively, at least 0.2 µm, alternatively at least 0.5 µm. In some embodiments, the metal oxide layer has an average thickness in a range of about 0.2 µm to about 10 µm, alternatively, in a range of about 0.5 µm to about 5 µm. The metal oxide layer may include a stoichiometric oxide, a nonstoichiometric oxide or both. In some embodiments, the metal within the metal oxide layer may exist in multiple oxidation states. In some embodiments the metal oxide layer may have a gradient of oxygen content where the atomic % of oxygen adjacent to an electrically conductive layer is lower than the atomic % adjacent to the lithium storage layer.

In some embodiments, the metal oxide layer is formed by oxidation of a layer of a metallic precursor layer. For example, a metal can be thermally oxidized in the presence of oxygen, electrolytically oxidized, chemically oxidized in an oxidizing liquid or gaseous medium or the like to form the metal oxide layer. In some embodiments, the metal oxide layer is formed by dehydration of a metal hydroxide precursor layer. In some embodiments, the metal oxide layer is formed directly by atomic layer deposition (ALD), CVD, evaporation or sputtering. In some embodiments, the metal oxide is formed in the same chamber as, or in line with, a tool used to deposit the continuous porous lithium storage layer. Doped metal oxide layers can be formed by adding dopants or dopant precursors during the metal oxide formation step, or alternatively by adding dopants or dopant precursors to a surface of an electrically conductive layer prior to the metal oxide layer formation step, or alternatively treating a metal oxide layer with a dopant or dopant precursor after initial formation of the metal oxide layer. In some embodiments, the metal oxide layer itself may have some reversible or irreversible lithium storage capacity. In some embodiments, the reversible capacity of the metal oxide layer is lower than that of the continuous porous lithium storage layer. In some embodiments, the metal oxide layer may be porous.

In some embodiments, the metal oxide is formed by oxidizing a surface region of a metal substrate, for example, oxidation of a metal foil such as nickel foil. The non-oxidized portion of the metal foil acts as the electrically conductive layer and the oxidized portion corresponds to the metal oxide layer. This method is amenable to high-volume and low-cost production of current collectors. The oxidation conditions depend upon the metal/metal surface, the target oxide thickness and the desired oxide porosity. Unless otherwise stated, any reference to a particular metal includes alloys of that metal. For example, nickel foil may include pure nickel or any alloy of nickel wherein nickel is the primary component. In some embodiments, an alloy metal also oxidizes, and the oxide of nickel formed from the alloy may include that corresponding oxidized metal. In some embodiments, the current collector is formed by oxidation of a nickel substrate, e.g., a nickel foil, in ambient air in a furnace brought to a temperature of at least 300° C., alternatively at least 400° C., for example in a range of about 600° C. to about 900° C., or alternatively higher temperatures. The hold time depends upon the selected temperature and the desired thickness/porosity for the metal oxide layer. Typically, the oxidation hold time will be in a range of about 1 minute to about 2 hours, but shorter or longer times are contemplated. A surface pretreatment step may be applied to promote or otherwise control oxidation. Other metals such as copper and titanium may have other operational hold times, temperatures and pretreatments according to their propensity to be oxidized.

Figure 5:
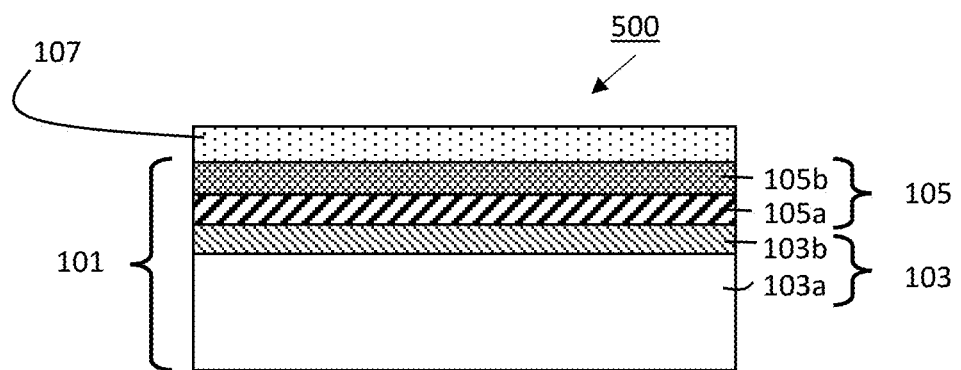
FIG. 5 is a cross-sectional view of an anode according to another embodiment of the present disclosure.

The current collector may have an electrically conductive layer that includes two or more sublayers differing in chemical composition. For example, the current collector may include metallic copper foil as a first electrically conductive sublayer, a second electrically conductive sublayer of metallic nickel provided over the copper, and a layer of a nickel oxide over the metallic nickel. As mentioned previously, the metallic copper and nickel may be in the form of alloys. Similarly, the metal oxide layer may include two or more sublayers differing in chemical composition. For example, the current collector may include a metallic copper foil, a layer of a copper oxide over the copper foil and a layer of titanium dioxide over 30 the copper oxide. FIG. 5 is a cross sectional view that illustrates these embodiments. Anode 500 of FIG. 5 is similar to anode 100 of FIG. 1 except that electrically conductive layer 103 is divided into first and second electrically conductive sublayers 103a and 103b, respectively, and metal oxide layer 105 is divided into first and second metal oxide sublayers 105a and 105b, respectively. Such sublayers may be discrete or take the form of a gradient in chemical composition. In some embodiments there may be a gradient or transition zone between the electrically conductive layer(s) and the metal oxide layer(s).

Continuous Porous Lithium Storage Layer

The continuous porous lithium storage layer includes a porous material capable of reversibly incorporating lithium.

In some embodiments, the continuous porous lithium storage layer includes silicon, germanium or a mixture of both. In some embodiments, the continuous porous lithium storage layer includes antimony or tin. In some embodiments, the continuous porous lithium storage layer is substantially amorphous. In some embodiments, the continuous porous lithium storage layer includes substantially amorphous silicon. Such substantially amorphous storage layers may include a small amount (e.g., less than 20 atomic %) of crystalline material dispersed therein. The continuous porous lithium storage layer may include dopants such as hydrogen, boron, phosphorous or metallic elements. In some embodiments the continuous porous lithium storage layer may include porous substantially amorphous hydrogenated silicon (a-Si:H), having, e.g., a hydrogen content of from 0.1 to 20 atomic %, or alternatively higher. In some embodiments, the continuous porous lithium storage layer may include methylated amorphous silicon.

In some embodiments, the continuous porous lithium storage layer includes at least 40 atomic % silicon, germanium or a combination thereof, alternatively at least 50 atomic %, alternatively at least 60 atomic %, alternatively at least 70 atomic %, alternatively, at least 80 atomic %, alternatively at least 90 atomic %. In some embodiments, the continuous porous lithium storage layer includes at least 40 atomic % silicon, alternatively at least 50 atomic %, alternatively at least 60 atomic %, alternatively at least 70 atomic %, alternatively, at least 80 atomic %, alternatively at least 90 atomic %.

In some embodiments, the continuous porous lithium storage layer includes less than 10 atomic % carbon, alternatively less than 5 atomic %, alternatively less than 2 atomic %, alternatively less than 1 atomic %. In some embodiments, the continuous porous lithium storage layer includes less than 5% by weight of carbon-based binders, graphitic carbon, graphene, graphene oxide, carbon black and conductive carbon.

The continuous porous lithium storage layer includes voids or interstices (pores), which may be random or non-uniform with respect to size, shape and distribution. Such porosity does not result in, or a result from, the formation of any recognizable nanostructures such as nanowires, nanopillars, nanotubes, nanochannels or the like. In some embodiments, the pores are polydisperse. In some embodiments, when analyzed by SEM cross section, 90% of pores larger than 100 nm in any dimension are smaller than about 5 μm in any dimension, alternatively smaller than about 3 alternatively smaller than about 2 In some embodiments the continuous porous lithium storage layer has an average density in a range of about 1.1 $g/cm_3$ to about 2.25 $g/cm^3$, alternatively about 1.4 $g/cm_3$ to about 2.2 $g/cm^3$, alternatively about 1.6 $g/cm^3$ to about 2.1 $g/cm^3$, and includes at least 40 atomic % silicon.

In some embodiments, the majority of active material (e.g., silicon, germanium or alloys thereof) of the continuous porous lithium storage layer has substantial lateral connectivity across portions of the current collector creating, such connectivity extending around random pores and interstices (as discussed later). Referring again to FIG. 1, in some embodiments, "substantial lateral connectivity" means that active material at one point X in the continuous porous lithium storage layer 107 may be connected to active material at a second point X' in the layer at a straight-line lateral distance LD that is at least as great as the thickness T of the continuous porous lithium storage layer, alternatively, a lateral distance at least 2 times as great as the thickness, alternatively, a lateral distance at least 3 times as great as the thickness. Not shown, the total path distance of material connectivity, including circumventing pores, may be longer than LD. In some embodiments, the continuous porous lithium storage layer may be described as a matrix of interconnected silicon, germanium or alloys thereof, with random pores and interstices embedded therein. In some embodiments, the continuous porous lithium storage layer has a sponge-like form. In some embodiments, about 75% or more of the metal oxide layer surface is contiguous with the continuous porous lithium storage layer, at least prior to electrochemical formation. It should be noted that the continuous porous lithium storage layer does not necessarily extend across the entire anode without any lateral breaks and may include random discontinuities or cracks and still be considered continuous.

As mentioned, the continuous porous lithium storage layer, e.g., a layer of silicon or germanium or both, may be provided by plasma-enhanced chemical vapor deposition (PECVD). Relative to CVD, deposition by PECVD can often be done at lower temperatures and higher rates, which can be advantageous for higher manufacturing throughput. In some embodiments, the PECVD is used to deposit a substantially amorphous silicon layer (optionally doped) over the metal oxide layer. In some embodiments, PECVD is used to deposit a substantially amorphous continuous porous silicon layer over the metal oxide layer.

PECVD

In PECVD processes, according to various implementations, a plasma may be generated in a chamber in which the substrate is disposed or upstream of the chamber and fed into the chamber. Any type of plasma, including capacitively-coupled plasmas, inductively-coupled plasmas, and conductive coupled plasmas may be used. Any appropriate plasma source may be used, including DC, AC, RF, VHF, combinatorial PECVD and microwave sources may be used.

PECVD process conditions (temperatures, pressures, precursor gases, flow rates, energies and the like) can vary according to the particular process and tool used, as is well known in the art.

In some implementations, the PECVD process is an expanding thermal plasma chemical vapor deposition (ETP-PECVD) process. In such a process, a plasma generating gas is passed through a direct current arc plasma generator to form a plasma, with a web or other substrate including the current collector optionally in an adjoining vacuum chamber. A silicon source gas is injected into the plasma, with radicals generated. The plasma is expanded via a diverging nozzle and injected into the vacuum chamber and toward the substrate. An example of a plasma generating gas is argon (Ar). In some embodiments, the ionized argon species in the plasma collide with silicon source molecules to form radical species of the silicon source, resulting in deposition onto the current collector. Example ranges for voltages and currents for the DC plasma source are 60 to 80 volts and 40 to 70 amperes, respectively. Any appropriate silicon source may be used to deposit silicon layers, including silane ($SiH_4$), dichlorosilane ($H_2SiCl_2$), monochlorosilane ($H_3SiCl$), trichlorosilane ($HSiCl_3$), and silicon tetrachloride ($SiCl_4$) to form the silicon layers. Depending on the gas used, the silicon layer may be formed by decomposition or a reaction with another compound, such as by hydrogen reduction.

The thickness or mass per unit area of the continuous porous lithium storage layer depends on the storage material, desired charge capacity and other operational and lifetime considerations. Increasing the thickness typically provides more capacity. If the continuous porous lithium storage layer becomes too thick, electrical resistance may increase and the stability may decrease, e.g., due to pulverization effects. In some embodiments, the continuous porous lithium storage layer includes substantially amorphous, porous silicon and has an average areal density of at least 0.1 mg/cm$^2$, alternatively at least 0.2 mg/cm$^2$, alternatively, at least 0.3 mg/cm$^2$, alternatively at least 0.4 mg/cm$^2$, or alternatively, at least 0.5 mg/cm$^2$. In some embodiments, the continuous porous lithium storage layer includes substantially amorphous, porous silicon and has an average areal density in a range of about 0.1 mg/cm$^2$ to about 10 mg/cm$^2$, alternatively in a range of about 0.2 mg/cm$^2$ to about 10 mg/cm$^2$, alternatively, in a range of about 0.3 mg/cm$^2$ to about 5 mg/cm$^2$. In some embodiments the continuous porous lithium storage has an average thickness of at least 0.2 µm, alternatively, at least 0.5 µm. In some embodiments, the continuous porous lithium storage layer has an average thickness in a range of about 0.5 µm to about 30 µm, alternatively, in a range of about 1 µm to about 25 µm, or in a range of about 2 µm to about 15 µm.

In some embodiments, the continuous porous lithium storage layer includes silicon but does not contain a substantial amount of crystalline silicides, i.e., the presence of silicides is not readily detected by X-Ray Diffraction (XRD). Metal silicides, e.g., nickel silicide, commonly form when silicon is deposited at higher temperatures directly onto metal, e.g., nickel foil. Metal silicides such as nickel silicides often have much lower lithium storage capacity than silicon itself. In some embodiments, the average atomic % of silicide-forming metallic elements within the continuous porous lithium storage layer are on average less than 30 35%, alternatively less than 20%, alternatively less than 10%, alternatively less than 5%. In some embodiments, the average atomic % of silicide-forming metallic elements within the continuous porous lithium storage layer are in a range of about 0.1 to 10%, alternatively about 0.2 to 5%. In some embodiments, the atomic % of silicide forming metallic elements in the continuous porous lithium storage layer is higher nearer the current collector than away from the current collector.

Other Anode Features

The anode may optionally include various additional layers and features. For example, the anode may optionally be formed on an insulating carrier substrate. The current collector may include one or more features to ensure that a reliable electrical connection can be made. In some embodiments, a supplemental layer is provided over the continuous porous lithium storage layer.

In some embodiments, the supplemental layer is a protection layer to enhance lifetime or physical durability. The supplemental layer may be an oxide formed from the lithium storage material itself, e.g., silicon dioxide in the case of silicon, or some other suitable material. A supplemental layer may be deposited, for example, by ALD, CVD, PECVD, evaporation, sputtering, solution coating, ink jet or any method that is compatible with the anode. In some embodiments, the top surface of the supplemental layer corresponds to a top surface of the anode.

A supplemental layer should be reasonably conductive to lithium ions and permit lithium ions to move into and out of the continuous porous lithium storage layer during charging and discharging. In some embodiments, the lithium ion conductivity of a supplemental layer is at least $10_{-9}$ S/cm, alternatively at least $10_{-8}$ S/cm, alternatively at least $10_{-7}$ S/cm, alternatively at least $10_{-6}$ S/cm. In some embodiments, the supplemental layer acts as a solid-state electrolyte. Some non-limiting examples of materials used in a supplemental layer include metal oxides, nitrides or oxynitrides, e.g., those containing aluminum, titanium, vanadium, zirconium or tin, or mixtures thereof. The metal oxide, nitride or oxynitride may include other components such as phosphorous or silicon. The supplemental layer can include a lithium-containing material such as lithium phosphorous oxynitride (LIPON), lithium phosphate, lithium aluminum oxide, $(Li,La)_xTi_yO_z$, or $Li_xSi_yAl_2O_3$. In some embodiments, the supplemental layer includes a simple metal oxide, nitride or oxynitride, and has an average thickness of less than about 100 nm, for example, in a range of about 0.1 to about 10 nm, or alternatively in a range of about 0.2 nm to about 5 nm. LIPON or other solid-state electrolyte materials having superior lithium transport properties may have a thickness of more than 100 nm, but may alternatively, be in a range of about 1 to about 50 nm.

In some embodiments the anode is at least partially prelithiated, i.5 e., the continuous porous lithium storage layer and/or the metal oxide layer includes some lithium prior to battery assembly.

Battery Features

The preceding description relates primarily to the anode/negative electrode of a lithium-ion battery (LIB). The LIB typically includes a cathode/positive electrode, an electrolyte and a separator (if not using a solid-state electrolyte). As is well known, batteries can be formed into multilayer stacks of anodes and cathodes with an intervening separator. Alternatively, a single anode/cathode stack can be formed into a so-called jelly-roll. Such structures are provided into an appropriate housing having desired electrical contacts.

Cathode

Positive electrode (cathode) materials include, but are not limited to, lithium metal oxides or compounds (e.g., $LiCoO_2$, $LiFePO_4$, $LiMnO_2$, $LiNiO_2$, $LiMn_2O_4$, $LiCoPO_4$, $LiNi_xCo_yMn_zO_2$, $LiNi_xCo_yAl_zO_2$, $LiFe_2(SO_4)_3$, or $Li_2FeSiO_4$), carbon fluoride, metal fluorides such as iron fluoride ($FeF_3$), metal oxide, sulfur, selenium and combinations thereof. Cathode active materials are typically provided on, or in electrical communication with, an electrically conductive cathode current collector.

Current Separator

The current separator allows ions to flow between the anode and cathode but prevents direct electrical contact. Such separators are typically porous sheets. Non-aqueous lithium-ion separators are single layer or multilayer polymer sheets, typically made of polyolefins, especially for small batteries. Most commonly, these are based on polyethylene or polypropylene, but polyethylene terephthalate (PET) and polyvinylidene fluoride (PVdF) can also be used. For example, a separator can have >30% porosity, low ionic resistivity, a thickness of −10 to 50 µm and high bulk puncture strengths. Separators may alternatively include ceramic materials or multilayer structures, e.g., to provide higher mechanical and thermal stability.

Electrolyte

The electrolyte in lithium ion cells may be a liquid, a solid, or a gel. A typical liquid electrolyte comprises one or more solvents and one or more salts, at least one of which includes lithium. During the first few charge cycles (sometimes referred to as formation cycles), the organic solvent and/or the electrolyte may partially decompose on the negative electrode surface to form an SEI (Solid-Electrolyte-Interphase) layer. The SEI is generally electrically insulating but ionically conductive, thereby allowing lithium ions to pass through. The SEI may lessen decomposition of the electrolyte in the later charging cycles.

Some non-limiting examples of non-aqueous solvents suitable for some lithium ion cells include the following:

cyclic carbonates (e.g., ethylene carbonate (EC), propylene carbonate (PC), butylene carbonate (BC) and vinylethylene carbonate (VEC)), vinylene carbonate (VC), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC, also commonly abbreviated EMC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), organic compounds containing an S=O group (e.g., dimethyl sulfone and divinyl sulfone), and combinations thereof.

Non-aqueous liquid solvents can be employed in combination. Examples of these combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In some embodiments, a cyclic carbonate may be combined with a linear ester. Moreover, a cyclic carbonate may be combined with a lactone and a linear ester. In a specific embodiment, the ratio of a cyclic carbonate to a linear ester is between about 1:9 to 10:1, preferably 2:8 to 7:3, by volume.

A salt for liquid electrolytes may include one or more of the following non-limiting examples: $LiPF_6$, $LiBF_4$, $LiClO_4 LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3$ (iso-$C_3F_7$)$5_3$, $LiPF_5$(iso-$C_3F_7$), lithium salts having cyclic alkyl groups (e.g., $(CF_2)_2(SO_2)_{2x}Li$ and $(CF_2)_3(SO_2)_{2x}Li$), and combinations thereof. Common combinations include: $LiPF_6$ and $LiBF_4$; $LiPF_6$ and $LiN(CF_3SO_2)_2$; and $LiBF_4$ and $LiN(CF_3SO_2)_2$.

In some embodiments, the total concentration of salt in a liquid non-aqueous solvent (or combination of solvents) is at least 0.3 M, alternatively at least 0.7M. The upper concentration limit may be driven by a solubility limit and operational temperature range. In some embodiments, the concentration of salt is no greater than about 2.5 M, alternatively no more than about 1.5 M.

In some embodiments, the battery electrolyte includes a non-aqueous ionic liquid and a lithium salt.

A solid electrolyte may be used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as polyvinylidene fluoride (PVDF) or chloride or copolymer of their derivatives, poly(chlorotrifluoroethylene), poly(ethylene-chlorotrifluoro ethylene), or poly(fluorinated ethylene-propylene), polyethylene oxide (PEO) and oxymethylene linked PEO, PEO-PPO-PEO crosslinked with trifunctional urethane, poly(bis(methoxy-ethoxy-ethoxide))-phosphazene (MEEP), triol-type PEO crosslinked with difunctional urethane, poly((oligo)oxyethylene)methacrylate-co-alkali metal methacrylate, polyacrylonitrile (PAN), polymethylmethacrylate (PMMA), polymethylacrylonitrile (PMAN), polysiloxanes and their copolymers and derivatives, acrylate-based polymer, other similar solvent-free polymers, combinations of the foregoing polymers either condensed or crosslinked to form a different polymer, and physical mixtures of any of the foregoing polymers. Other less conductive polymers that may be used in combination with the above polymers to improve the strength of thin laminates include: polyester (PET), polypropylene (PP), polyethylene naphthalate (PEN), polyvinylidene fluoride (PVDF), polycarbonate (PC), polyphenylene sulfide (PPS), and polytetrafluoroethylene (PTFE). Such solid polymer electrolytes may further include a small amount of organic solvents listed above. The polymer electrolyte may be an ionic liquid polymer. Such polymer-based electrolytes can be coated using any number of conventional methods such as curtain coating, slot coating, spin coating, ink jet coating, spray coating or other suitable method.

Additives may be included in the electrolyte to serve various functions. For example, additives such as polymerizable compounds having an unsaturated double bond may be added to stabilize or modify the SEI. Certain amines or borate compounds can act as cathode protection agents. Lewis acids can be added to stabilize fluorine-containing anion such as $PF_{6-}$. Safety protection agents include those to protect overcharge, e.g., anisoles, or act as fire retardants, e.g., alkyl phosphates.

As mentioned previously, the solid-state electrolyte may instead be vapor deposited or a combination of vapor deposition and solution- or melt-coating may be used. Whether vapor deposited or coated from a solution or melt, embodiments of the present disclosure are advantageous over nanostructured devices. In the case of vapor deposited solid-state electrolytes, anodes of the present disclosure do not have the problem of physical "shadowing" that nano- or micro-structured devices do. Shadowing will create non-uniform deposition of the electrolyte. The anodes disclosed here generally do not have high aspect ratio structures as described above, resulting in no or low shadowing effects. Vapor deposited solid electrolytes can be deposited uniformly and rapidly over anodes of the present disclosure without resorting to slow atomic layer or other conformal coating methods. In the case of solution or melt-deposited solid-state electrolytes, anodes of the present disclosure may be more robust to the stresses and sheer forces caused by the coating operation. High aspect ratio nano- or micro-structures are susceptible to breakage from such forces.

Additional Lithium Storage Layers

The generally flat nature of the present anode further allows simple coating of additional lithium storage layers. For example, conventional LIB slurries based on carbon that may optionally further include silicon particles, may be coated over the continuous porous lithium storage layer of the present disclosure to further enhance charge capacity. Coating methods may include curtain coating, slot coating, spin coating, ink jet coating, spray coating or any other suitable method.

Examples 1 and 2

Example 1 Current Collector

A current collector was prepared by oxidation of a 16 µm thick nickel foil. The foil was provided into a muffle furnace under air at room temp, heated to 800° C. and held there for 60 minutes. The furnace was turned off and the sample was allowed to cool within the furnace. The layer of nickel oxide was approximately 2 to 3 μm thick.

Example 2 Current Collector

A second current collector was prepared by oxidation of a 16 μm thick nickel foil. The foil was provided into a muffle furnace under air at room temp, heated to 700° C. and held there for 30 minutes. The furnace was turned off and the sample was allowed to cool within the furnace. The layer of nickel oxide was approximately 0.2-0.6 μm thick.

Comparative 1 Current Collector

The same kind of nickel foil as used in the examples above was cleaned with an IPA wipe, but not subjected to any oxidation treatments.

Silicon Deposition

Silicon was concurrently deposited over the example and comparative current collectors using expanding thermal PECVD to form corresponding Example 1 Anode (from Example 1 Current Collector), Example 2 Anode (from Example 2 Current Collector), and Comparative 1 Anode (from Comparative 1 Current Collector). The formation gases were silane at about 0.20 slm (standard liters per minute) and hydrogen at about 0.20 slm, along with an argon carrier gas at about 2 slm. The process pressure was about 0.145 mbar.

Characterization

Silicon Content

Punches of the example and comparative anodes were digested in a mixture of HF and $HNO_3$ and elements were analyzed in duplicate by inductively coupled plasma atomic emission spectroscopy (ICP-AES). The areal coverage of silicon determined for each anode are shown in Table 1. Such areal coverages include all silicon on each anode as determined by ICP-AES, regardless of silicon form or layer structure.

TABLE 1

| ID | Sample | Silicon content, $mg/cm^2$ |
|---|---|---|
| A | Example 1 Anode | 0.9 |
| B | Example 1 Anode | 1.0 |
| C | Example 2 Anode | 1.1 |
| D | Example 2 Anode | 1.2 |
| E | Comparative 1 Anode | 2.3 |
| F | Comparative 1 Anode | 2.5 |

Appearance/Optical

Figure 6A:
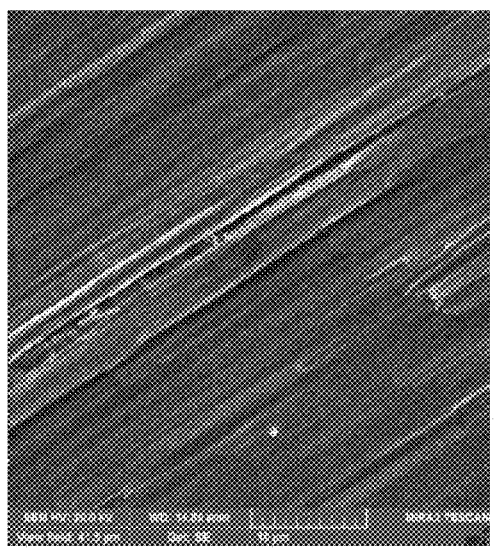
FIGS. 6A-6B are SEM micrographs showing a comparative current collector and comparative anode.
Figure 6B:
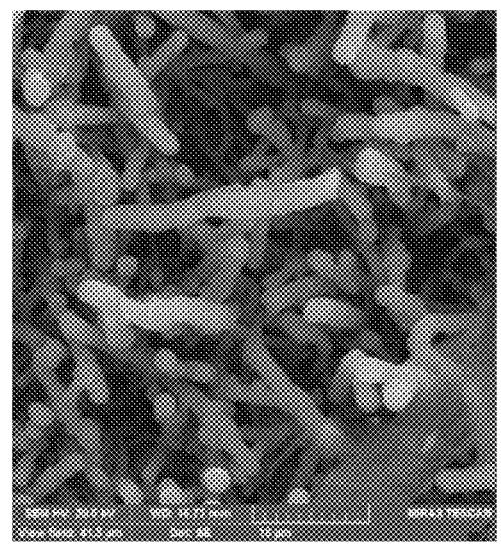
Figure 7A:
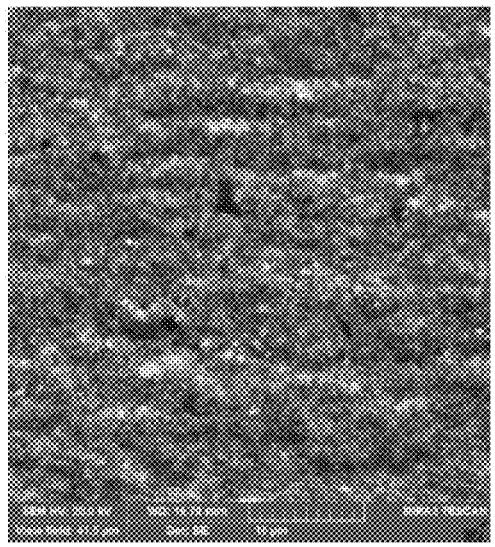
FIGS. 7A-7B are SEM micrographs showing an example current collector and example anode prepared according to an embodiment of the present disclosure.
Figure 7B:
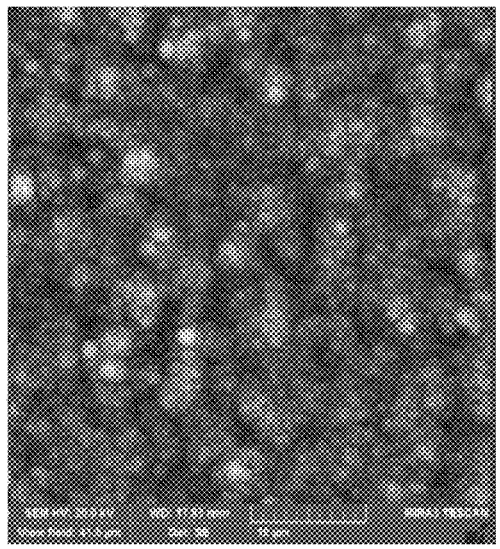
Figure 8A:
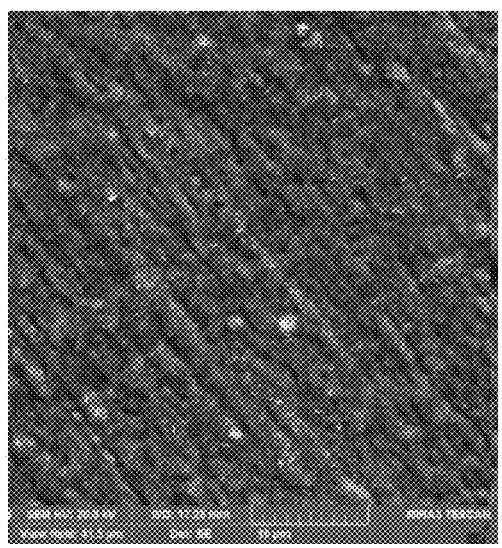
FIGS. 8A-8B are SEM micrographs showing an example current collector and example anode prepared according to another embodiment of the present disclosure.
Figure 8B:
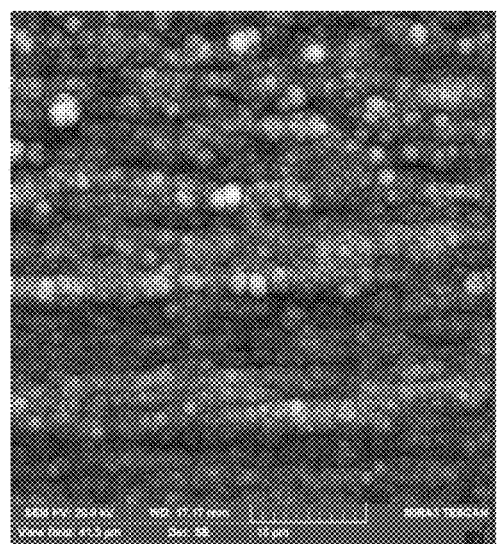
Figure 20:
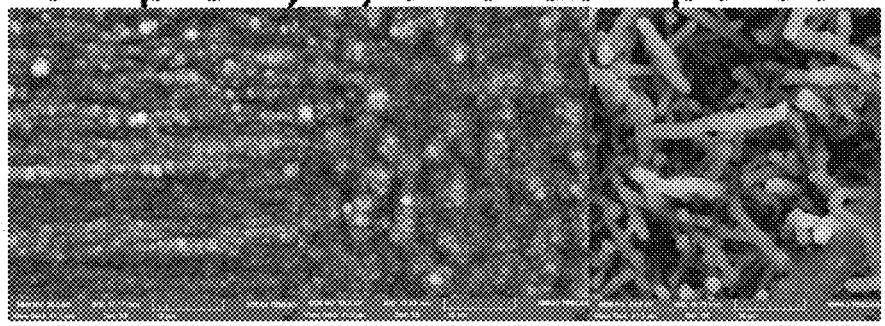
FIG. 20 shows normal and tilted view SEM micrographs of Example 1, Example 2, and Comparative anode illustrating deposited layer surface structures.
Figure 20:
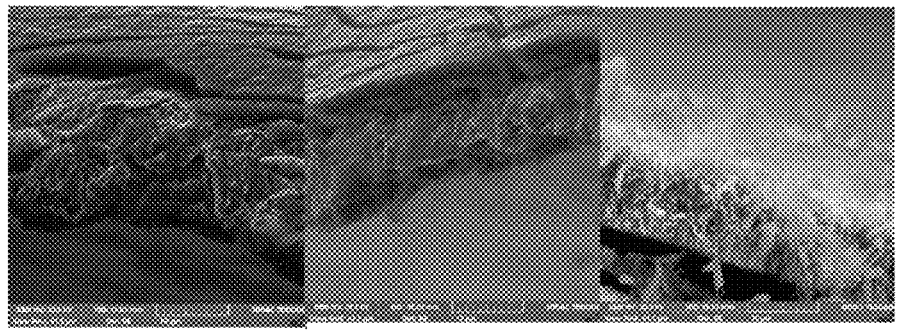

Viewed at the Si-containing side, Example Anodes 1 and 2 each have a silvery, metallic appearance, although not mirror-like. In contrast, the comparative anode has a sooty, black appearance. As shown the SEMs, the silicon of the comparative anode (FIG. 6B) is mostly in the form of nanowires, which results in the dark visible appearance. Example Anode 1 (FIG. 7B) and Example 2 Anode (FIG. 8B), however, are largely devoid of such structures. More particularly, as evident from normal and tilted cross-sectional views of FIG. 20 (40×40 μm square view windows), the comparative anode contains ≥10 vertical (aligned ≥45° to underlying surface) structural elements with ≥3:1 aspect ratio (height-to-width) elements when viewed @ 5K magnification via SEM (i.e., ≥10 such high aspect ratio structural elements per 1600 square micrometers), while the Example 1 and 2 anodes contain no such high aspect ratio features (less than 1 such high aspect ratio feature per 1600 square micrometers).

Figure 21:
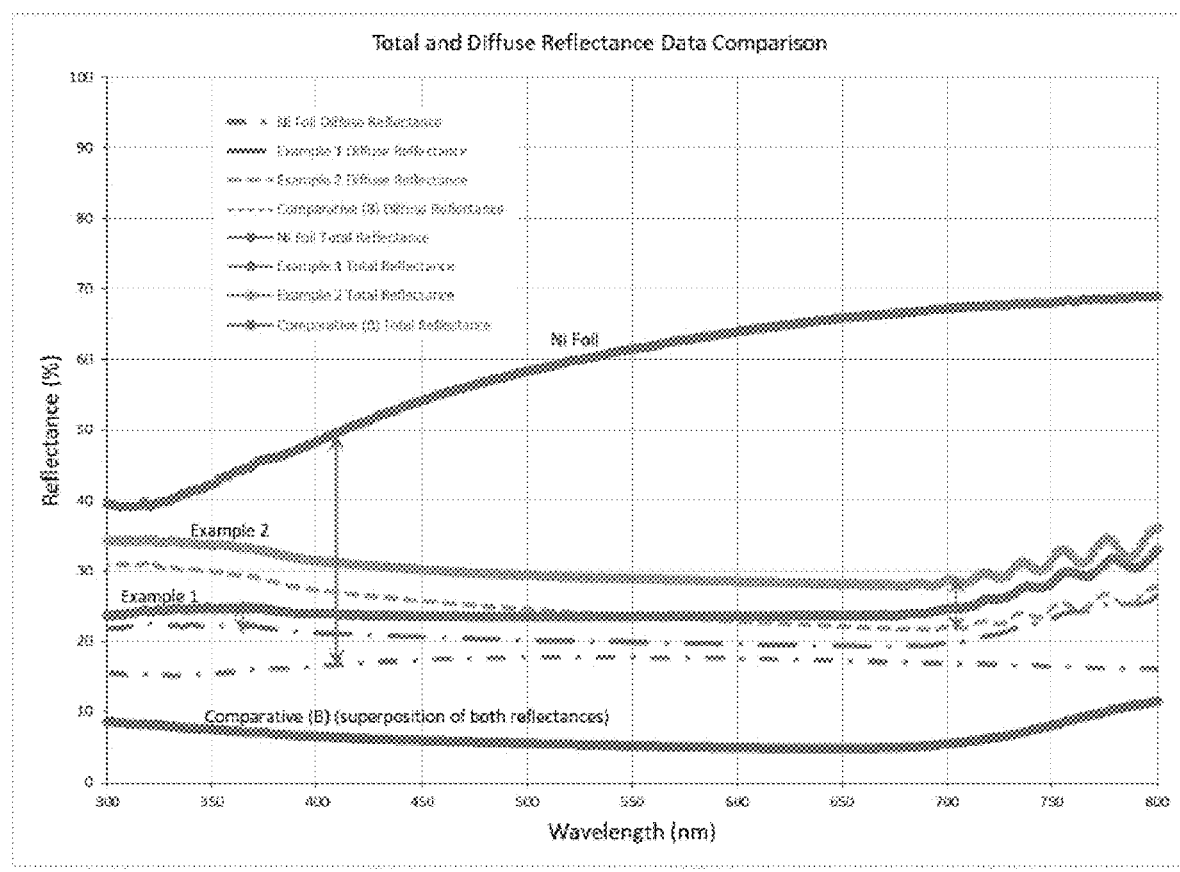
FIG. 21 shows total and diffuse reflectance spectral comparisons for example and comparative coated anodes, and uncoated nickel foil as a function of wavelength.

Total and diffuse reflectance measurements on the silicon-containing side were made between 300 and 800 nm to quantify the difference in appearance, where total reflectance (Rt) is the sum of both specular (Rs) and diffuse (Rd) reflectances. For specular (Rs) (Θout=Θin ~mirror like), and for diffuse (Rd) (Θout=Θ many random angles of reflected rays). For matte materials, one expects Rt~Rd due to lack of specular reflection. For non-mirror shiny materials, one expects Rt>Rd, since Rt=Rd+Rs. If neutral in appearance, one would expect % reflectance to be approximately the same at all wavelengths. Gray/white/black appearance is a function of the sample luminance (Ysample) relative to a perfect white reflector (Ywhite). CIE L* lightness is used to estimate this appearance according to the following equation: $L^* = 116(Ysample/Ywhite)^{1/3} - 16$. Since the samples are approximately spectrally flat, Ysample can be replaced by Rd sample @ 550 nm so that this becomes $L^* = 116(Rd(550 nm))^{1/3} - 16$. L*~40-60 would appear grayish, typically L*>78 would appear whitish and L*<15 would appear black. A second comparative anode was made in the same way as described above and had the same dark appearance. The diffuse and total reflectance curves of the comparative anode as shown in the attached FIG. 21 were substantially overlapped indicating nearly zero specular reflectance. In the visible range of ~400 to 700 nm, the total reflectance was less than 10%. At 550 nm it was about 5%.

The reflectance properties of the example anodes were very different from the comparative. The examples both had total reflectance and diffuse reflectance well above 10% throughout the range of 400 to 700 nm. At 550 nm, the total reflectance for Example Anodes 1 and 2 were about 29% and 24%, respectively. At 550 nm, the diffuse reflectance for Example Anodes 1 and 2 were about 24% and 20%, respectively. Further, the total reflectance was noticeably higher than the diffuse reflectance throughout the range of 400 to 700 nm. By noticeably higher, it is meant that the ratio of total to diffuse reflectance is ≥1.05 at over 300 nm-800 nm wavelength range. At 550 nm for both examples, the ratio is >1.15. In comparison, over 300 nm-800 nm, the comparative example ratio is 1.00±0.01 (noise), consistent with diffuse reflectance only for this kind of material. This difference is indicative of a specular component that is largely absent in the comparative anode.

SEMs

Microstructure differences between the comparative and example anodes are readily apparent as shown in FIGS. 6-8 and 20. FIG. 6A is an SEM micrograph showing a top view of the Comparative 1 Current Collector and FIG. 6B shows corresponding Comparative 1 Anode. FIG. 7A is an SEM micrograph showing a top view of Example 1 Current Collector and FIG. 7B shows corresponding Example 1 Anode. FIG. 8A is an SEM micrograph showing a top view of Example 2 Current Collector and FIG. 8B shows corresponding Example 2 Anode.

The comparative anode includes silicon in the form of high aspect ratio nanowires as discussed above. In contrast, the example anodes have some surface texture, but have substantially no high aspect ratio nanostructures. Energy dispersive X-ray spectroscopy (EDS) analyses (FIGS. 9-11) of the example and comparative anodes show that their surfaces are predominantly silicon. The exact percentage depends on where the SEM is focused, especially for the comparative anode, which has higher variability. Although the EDS analyses are not remarkably different between the comparative and example anodes, the nickel oxide layer of the current collector has significantly altered the silicon deposition mechanism. Both the amount of deposited silicon (above) and the physical form of the silicon are quite different.

XRD

Figure 22:
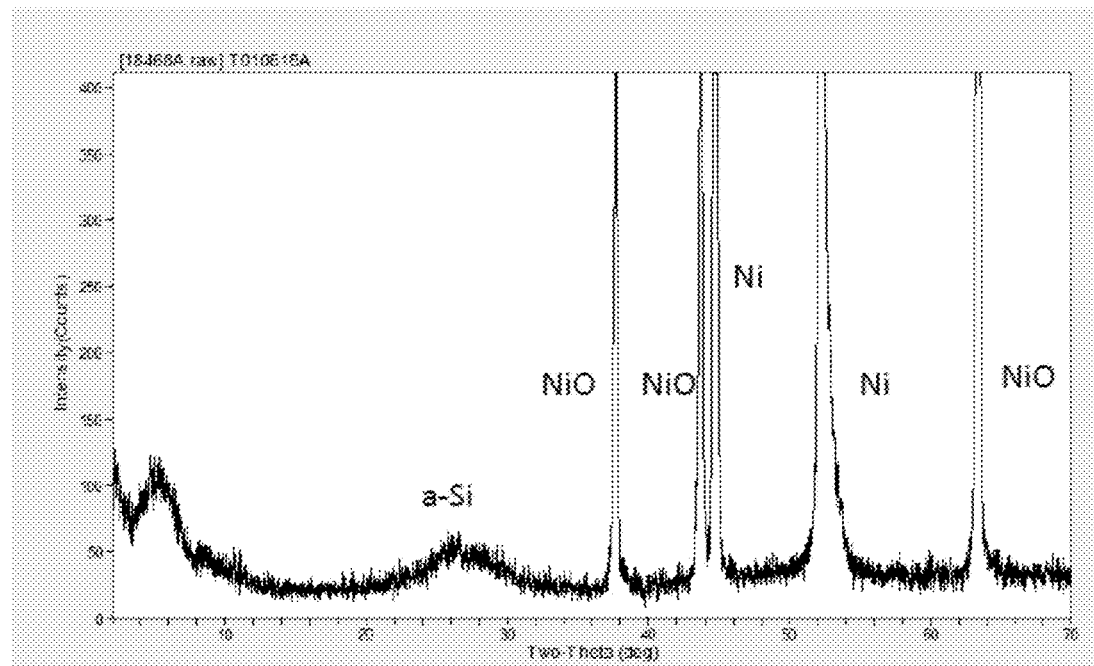
FIGS. 22 and 23 show XRD analysis of Example Anodes 1 and 2.
Figure 23:
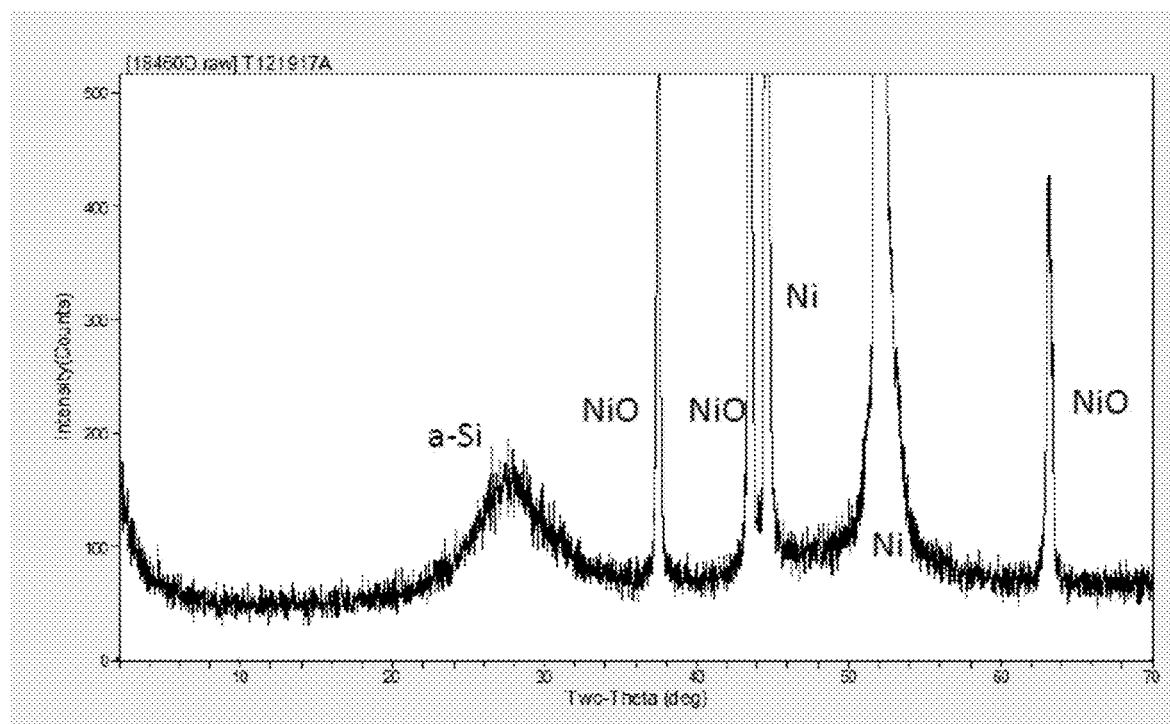
Figure 24:
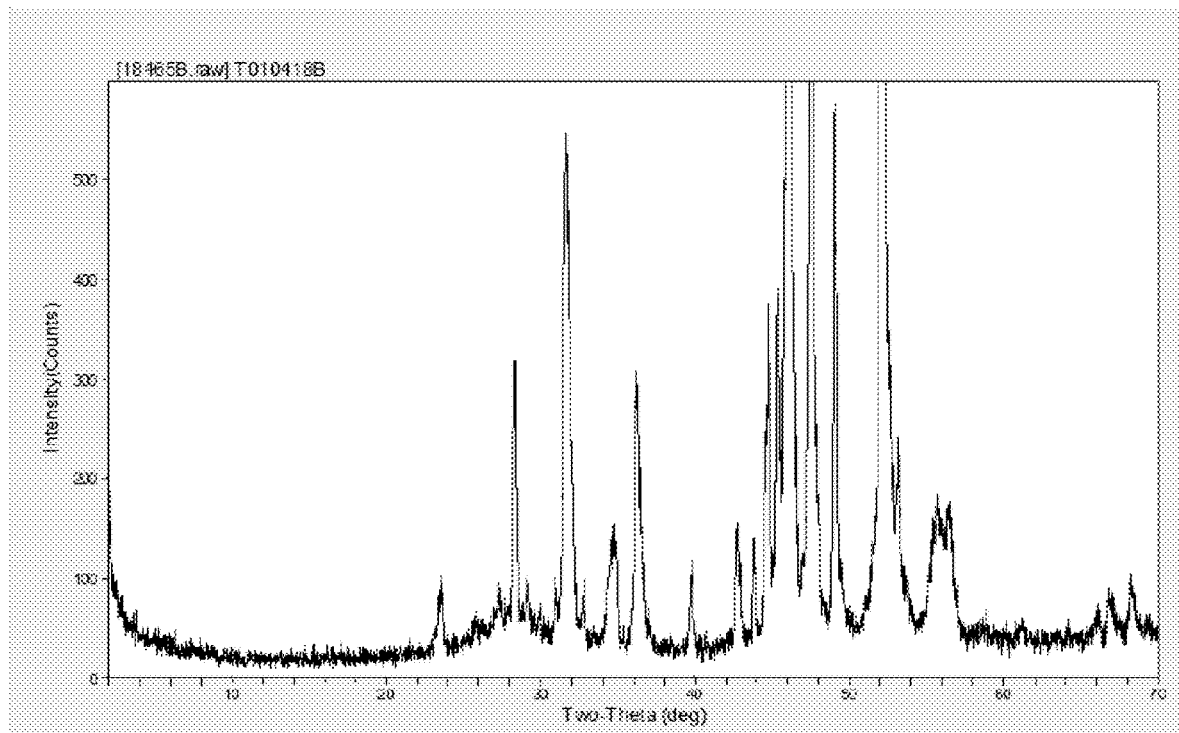
FIG. 24 shows XRD analysis of the Comparative Anode.

X-Ray Diffraction (XRD) analysis is useful to identify crystalline (including microcrystalline) materials. Compounds are identified through comparison to published diffraction patterns of reference samples of known crystal structure or to modeled data. FIGS. 22 and 23 show XRD analysis of the Ni foil after oxidation treatment and silicon deposition in preparation of Example Anodes 1 and 2, respectively. The XRD patterns show existence of Ni (base foil)+overlying NiO+a-Si deposition. Although rigorously amorphous Si (a-Si) is not expected to exhibit a diffraction pattern (typically only crystalline materials of fixed lattice spacing do), literature indicates a-Si possesses regions of "micro-crystallinity" that yield the broad signal seen in FIGS. 22 and 23. XRD analysis of the Comparative 1 Anode is shown in FIG. 24, on the other hand, wherein the silicon was deposited directly on the Ni foil without prior oxidation treatment, shows numerous distinctive signals associated with various 30 nickel silicides ($Ni_xSi_y$), e.g., $Ni_2Si$ and NiSi. That is, the comparative anode appears to contain both amorphous silicon and crystalline nickel silicides. Unlike Comparative 1 Anode, however, neither Example 1 Anode nor Example 2 Anode show diffraction patterns associated with crystalline silicides.

EDS

Figure 9:
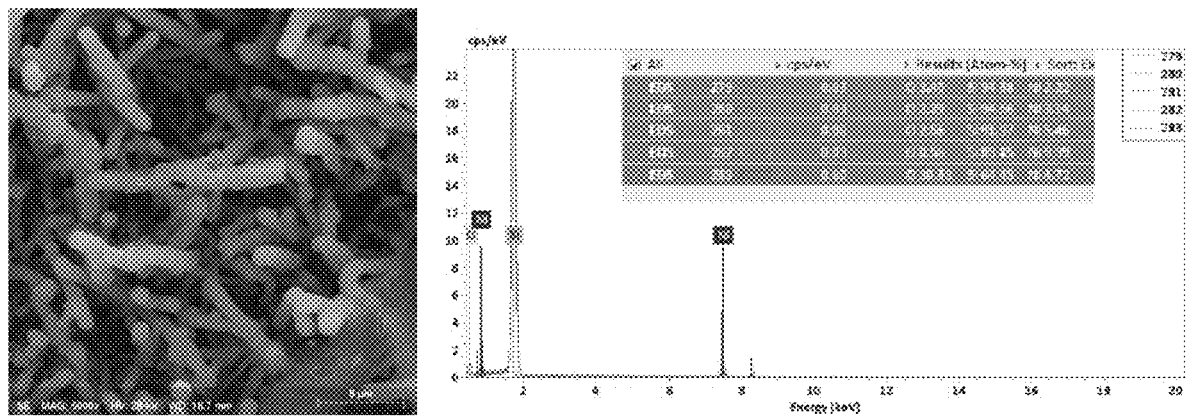
FIG. 9 shows an EDS analysis and SEM micrograph for a comparative anode.
Figure 10:
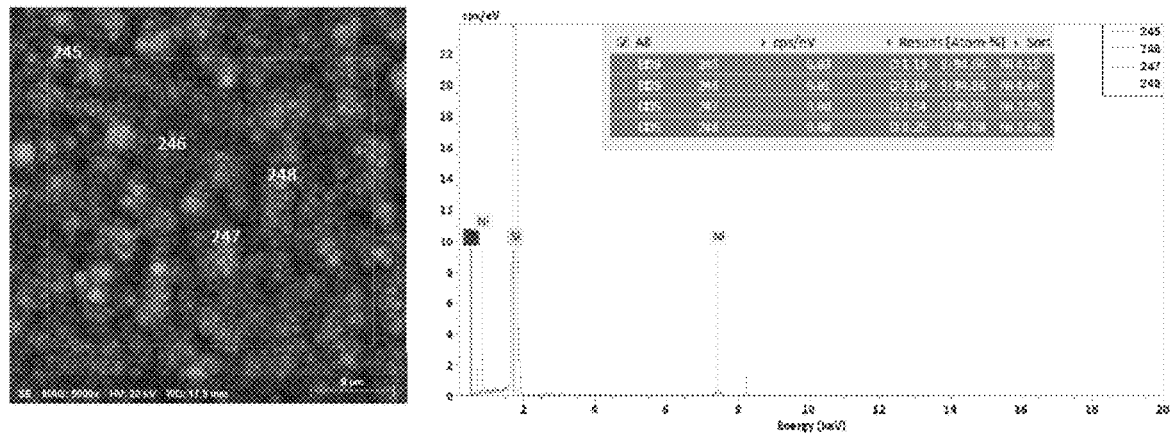
FIG. 10 shows an EDS analysis and SEM micrograph for an example anode according to an embodiment of the present disclosure.
Figure 11:
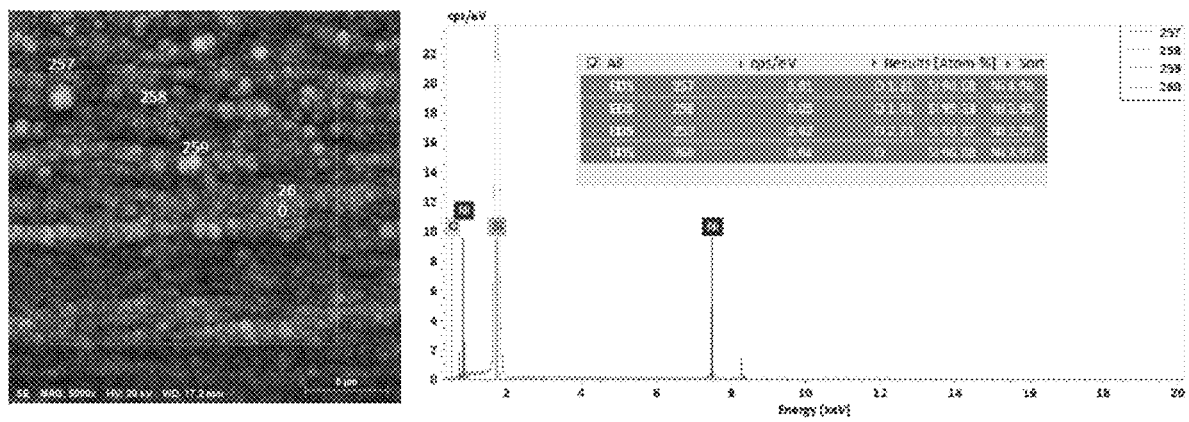
FIG. 11 shows an EDS analysis and SEM micrograph for an example anode according to another embodiment of the present disclosure.
Figure 12:
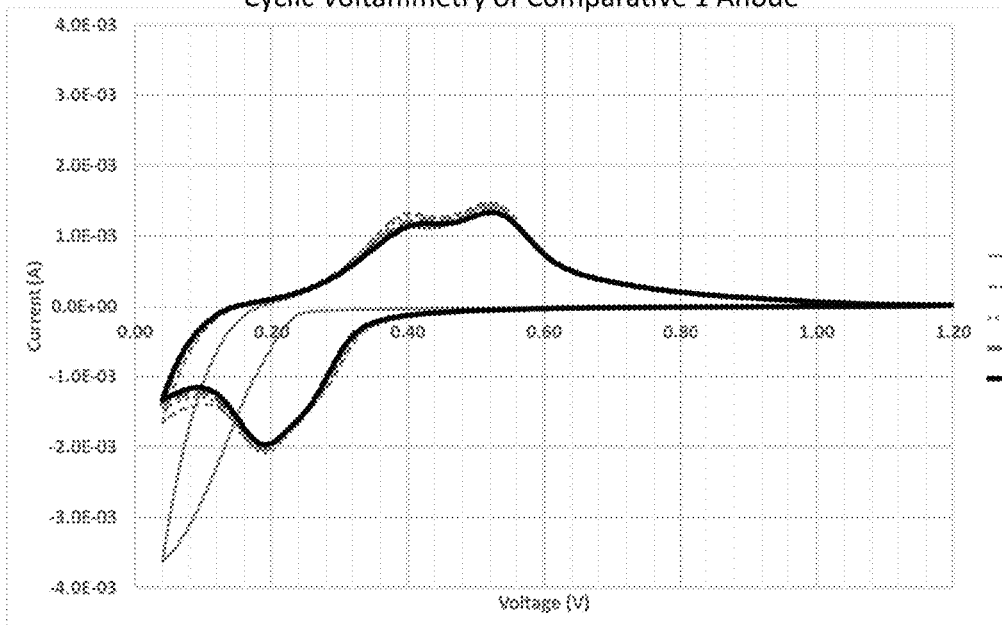
FIG. 12 shows cyclic voltammograms of a comparative anode illustrating electrochemistry associated with lithiation and delithiation.
Figure 13:
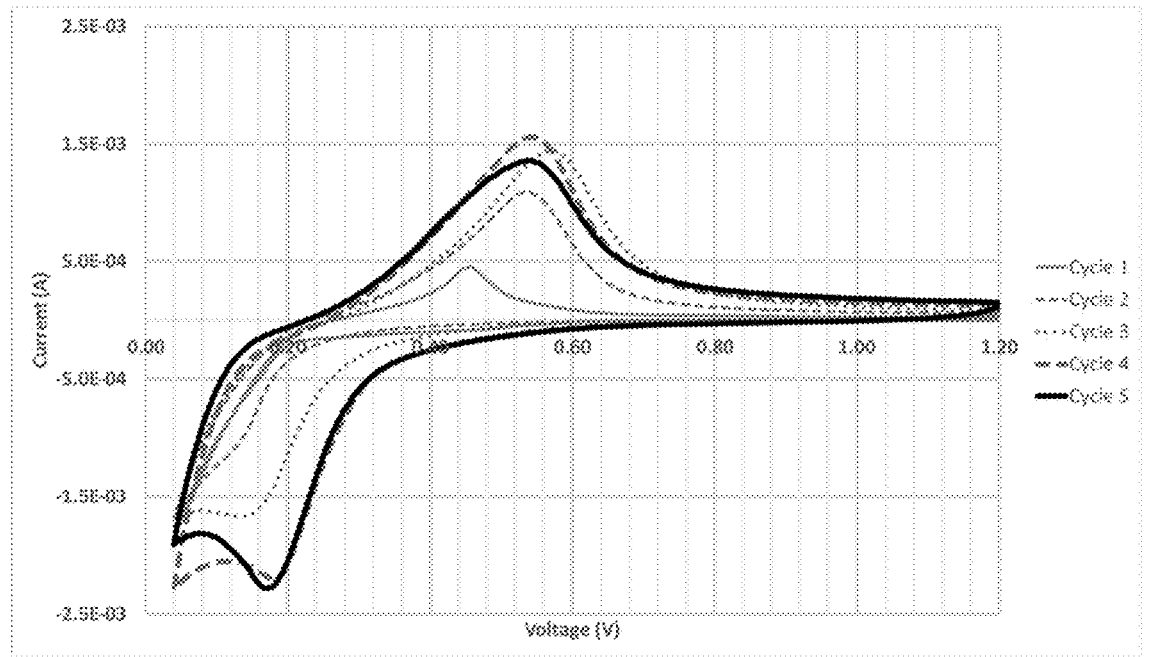
FIG. 13 shows cyclic voltammograms of an example anode, made according to an embodiment of the present disclosure, illustrating electrochemistry associated with lithiation and delithiation.
Figure 14:
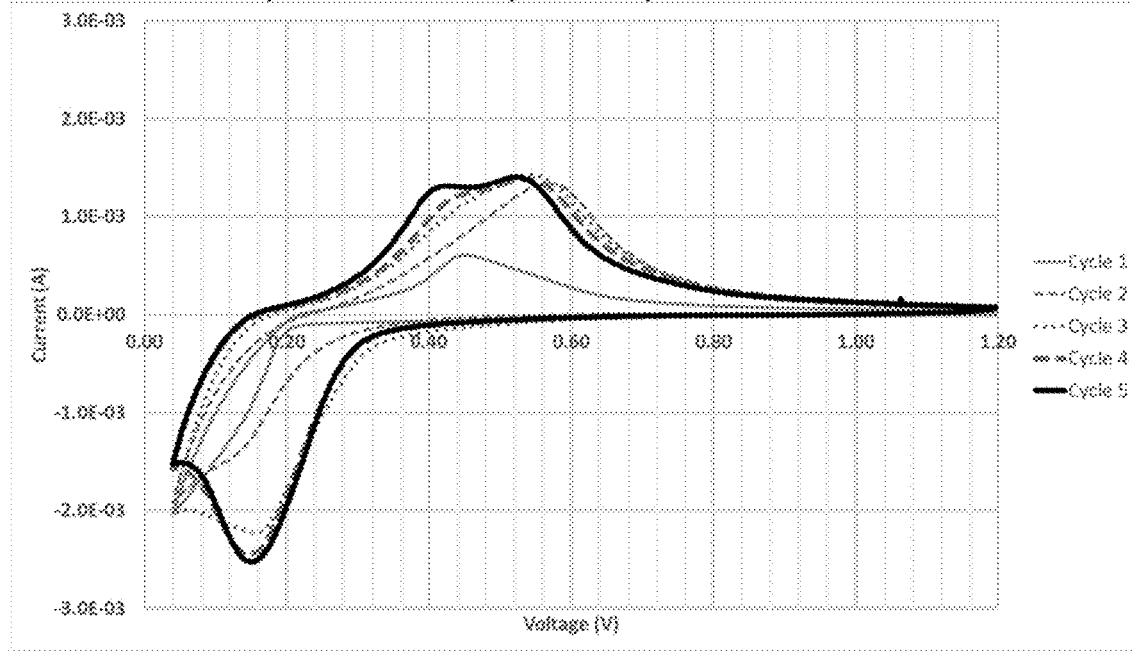
FIG. 14 shows cyclic voltammograms of an example anode, made according to another embodiment of the present disclosure, illustrating electrochemistry 5 associated with lithiation and delithiation.
Figure 15:
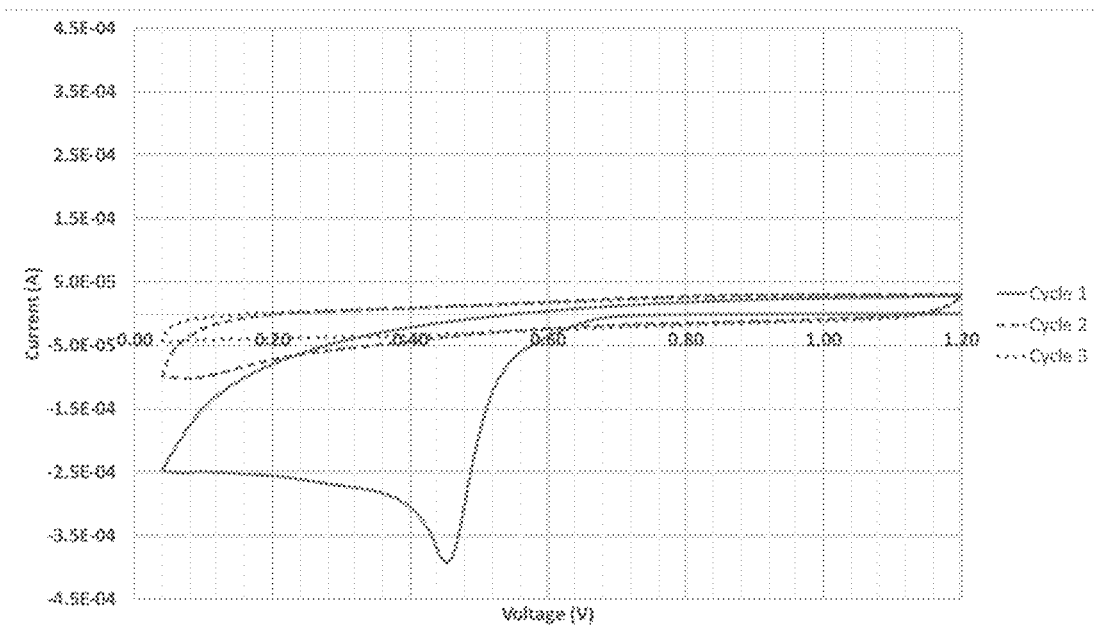
FIG. 15 shows cyclic voltammograms of an example current collector before deposition of silicon illustrating the general lack of appreciable and reversible lithiation/delithiation.

The EDS analyses in FIGS. 9-11 find both Si and some Ni in the 5 comparative and example anodes, at least as measured from the top surface of the anodes. Note that one should use caution interpreting EDS data in layered structures since they are subject to potential interferences, e.g., "penetration effects". The presence of Ni in the EDS for the comparative anode is not surprising given the strong nickel silicide signals in the XRD. The presence of Ni in the example anodes may be due to the presence of nickel silicides that have low or substantially no crystallinity, and/or due to small amounts of nickel in the amorphous silicon.

Physical Durability

The comparative anode is fragile and the silicon micro- and nanostructures are easily damaged by simple handling. Wiping the comparative anode with a dry cotton swab finds a significant amount of the black silicon material transferred to the swab, whereas a similar wipe on the example anodes shows no obvious residue. Thus, the example anodes are physically more robust than the comparative anode.

Electrochemical

Cyclic voltammetry (CV) is a useful technique to characterize a material's lithiation and delithiation properties. It can further provide insight into formation processes, as multiple chemical reactions are known to occur during the formation step. Cyclic voltammograms of anode half cells were carried out in a 50/50 volume % mixture of EC and DEC solvent with 1M $LiBF_4$ and 1% VC (SEI stabilizer) under an argon atmosphere. Lithium metal served as the counter and reference electrode which was separated from the 1.27 $cm^2$ test anode using two Celgard™ 2500 separators. CVs for the Comparative 1 Anode, Example 1 Anode, Example 2 Anode and Example 1 Current Collector (no silicon deposited) were collected at 0.1 mV/sec scan rate and are shown in FIGS. 12-15. It can be seen that the formation process of Comparative 1 Anode requires only 2 scans, after which continued cycling exhibits very similar CVs. The example anodes, however, both take more than 2 scans to complete the formation process. During the formation process, a portion of the metal oxide layer may be electrochemically transformed to metallic nickel. The CV on Example 1 Current Collector (no silicon deposited) shows that the nickel oxide layer is not directly participating in reversible lithiation-delithiation chemistry (note that the current scale is much smaller than the other CVs). The first cycle peak appears to be a redox "clean-up" of spurious water and other impurities, and reduction of some nickel oxide. Cycles 2 and 3 show no lithiation/delithiation evidence and the current is very low.

Half Cell Performance

Half cells of Comparative Anode and Example 2 Anode were constructed using the same general cell configuration as the cyclic voltammetry but using 1.0 M $LiPF_6$ in 3:7 EC:EMC with 10% FEC+2% VC as the electrolyte. Anodes first underwent a formation step. As is known in the art, the formation step is used to form an initial SEI layer. Relatively gentle conditions of low current and limited voltages may be used to ensure that the anode is not overly stressed. Formation of the example and comparative anodes used 5 cycles at −0.2 mA charging (lithiation) and +0.2 mA discharging (delithiation) currents. The ending charge capacities for the Comparative 1 Anode and Example 2 Anode were found to be 1.5 mAh and 2.0 mAh, respectively. Surprisingly, even though the Comparative Anode silicon was deposited under the same conditions, its initial areal charge capacity is 25% less than Example 2 Anode.

Figure 16:
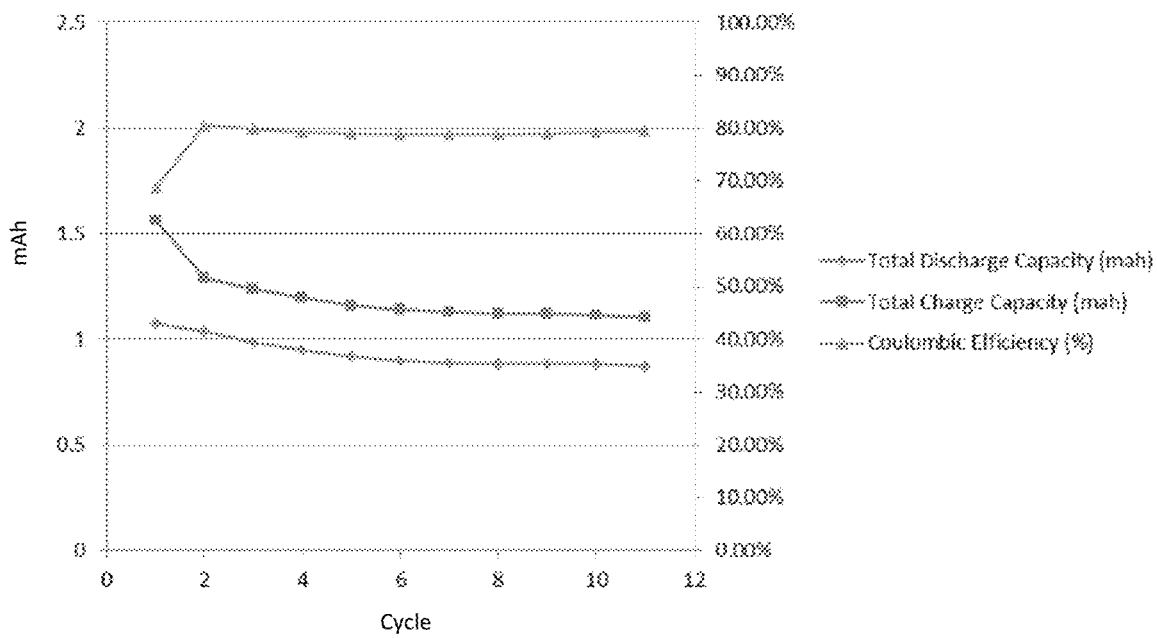
FIG. 16 shows the charge capacity and cycling stability at 2C charging of a comparative anode.
Figure 17:
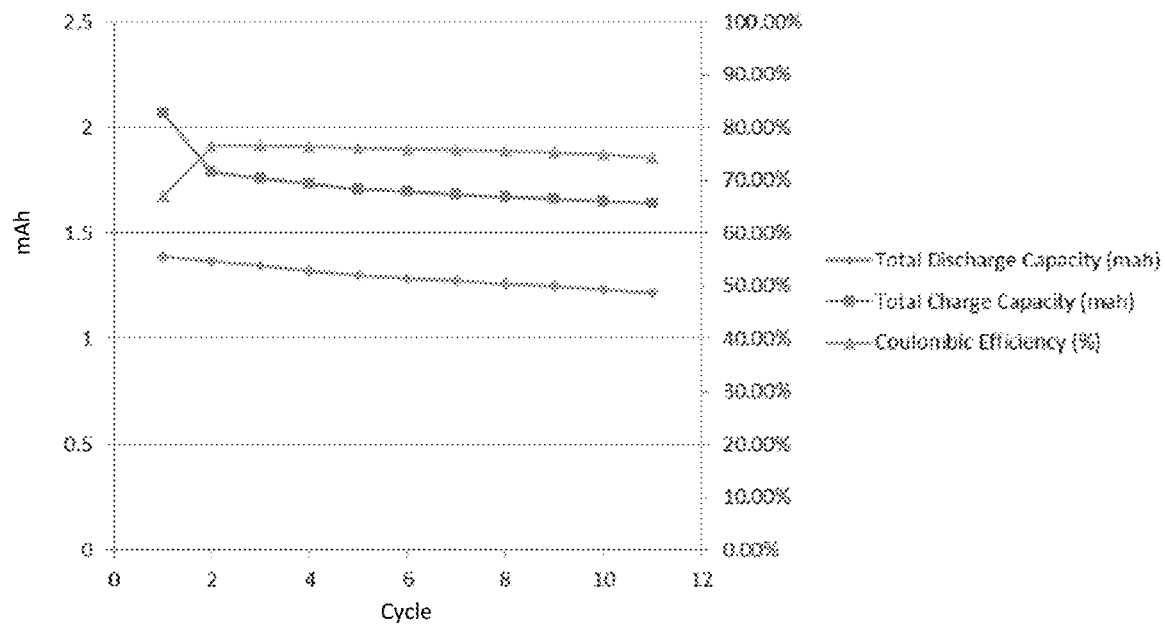
FIG. 17 shows the charge capacity and cycling stability at 2C charging of an example anode made according to an embodiment of the present disclosure.
Figure 18:
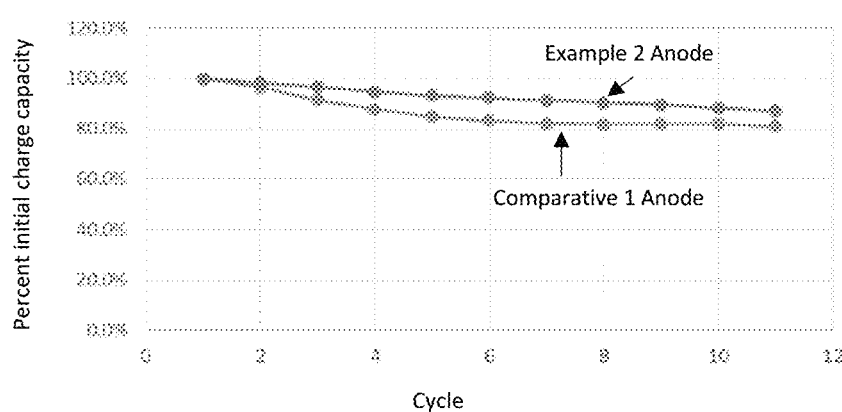
FIG. 18 shows the cycling stability at 2C charging of an example anode and a comparative anode relative to their respective initial charge capacities.
Figure 19:
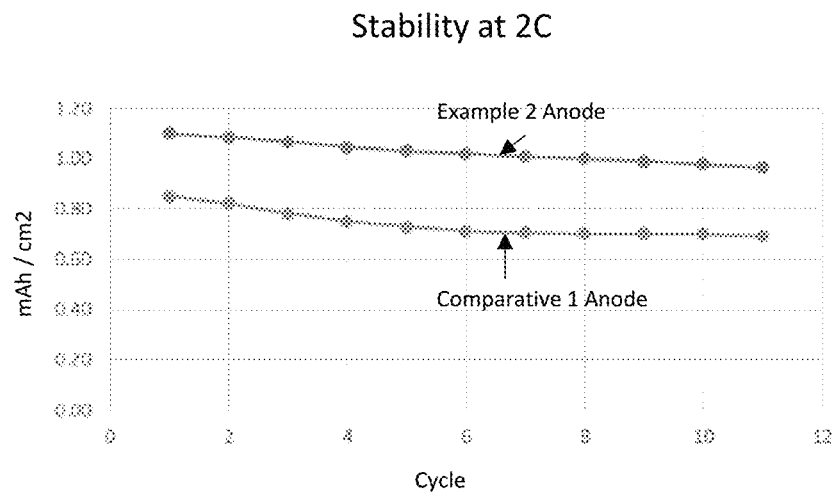
FIG. 19 shows the areal charge capacity and cycling stability at 2C charging of an example anode and a comparative anode.

Following formation, the anodes were tested by cycling at a charging rate of 2C, which is a very stressful test. Most cycling reported in the literature is at C/2 or lower to preserve longevity. For both lithiation and delithiation, a constant current was initially applied until a voltage limit was reached, at which point the cell is switched to constant voltage until a current limit of ~C/10 is reached. The voltage limits were set at 0.04 to 0.60 V (therefore the cell is operating at less than full capacity), and 11 cycles were run. The 2C cycling performance is shown for Comparative 1 Anode and Example 2 Anode in FIGS. 16 and 17 respectively. Direct comparisons of the two anodes are provided in FIGS. 18 (relative charge capacity with cycling) and 19 (absolute areal charge capacity with cycling).

The cycling plots indicate that the example anode is at least as stable as the comparative anode, and maybe slightly more stable. The example anode also has higher areal charge capacity than the comparative by roughly 25%, despite the lower silicon loading.

Example 3

Example 3 Current Collectors were prepared by placing a nickel foil in a muffle furnace and the temperature quickly raised to 700° C. in air. The furnace was held at elevated temperature for 30 minutes then allowed cool to room temperature, forming a nickel oxide layer about 0.5 to 1.2 μm thick. Comparative 3 Current Collectors used the same nickel foil but had no treatment other than a brief IPA wipe.

Example 3 Anodes were prepared by depositing amorphous silicon over Example 3 Current Collector using a High Density Plasma Chemical Vapor Deposition (HDPCVD) system. The thickness of the silicon layer was about 4 μm. Deposition onto Comparative 3 Current Collector generally resulted in unusable, poorly adhered, or non-adhered deposits (Comparative 3 Anodes).

Figure 25:
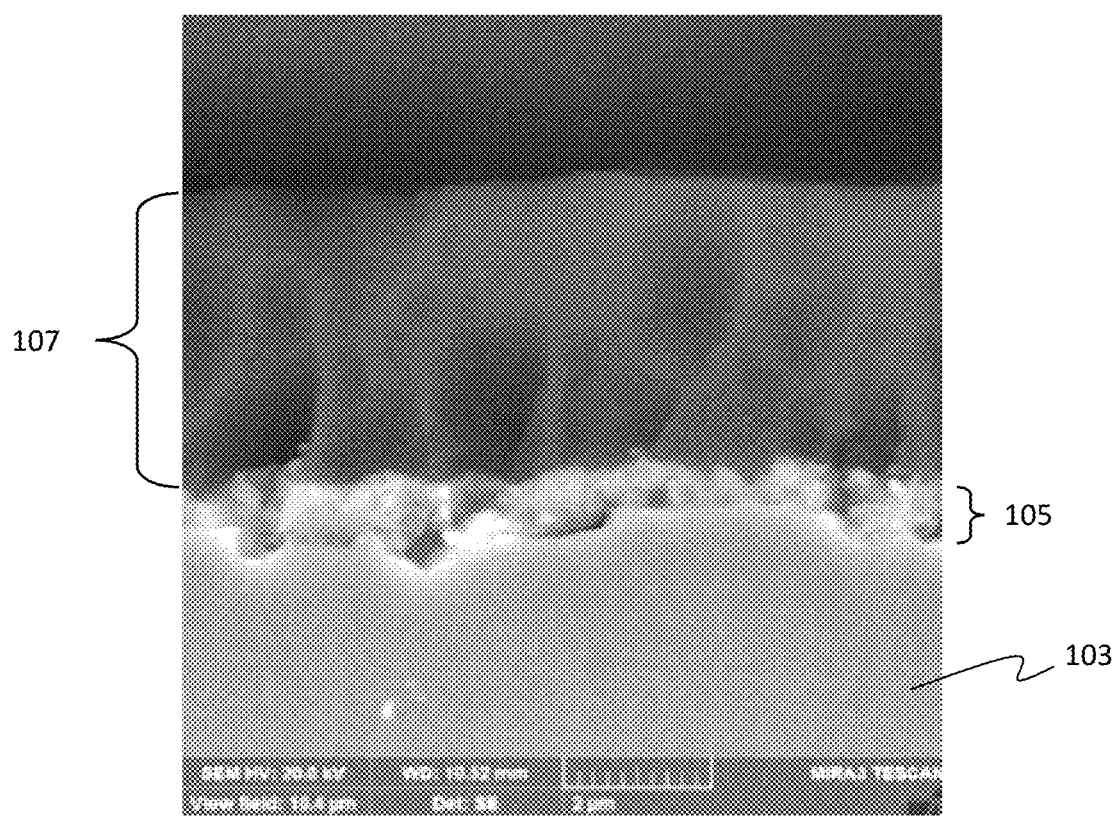
FIG. 25 shows a cross-sectional SEM of an anode according to an embodiment of the present disclosure.

A cross-sectional SEM of an Example 3 Anode is shown in FIG. 25 to illustrate an embodiment of a continuous porous lithium storage layer 107, metal oxide layer 105 and electrically conductive layer 103.

Figure 26A:
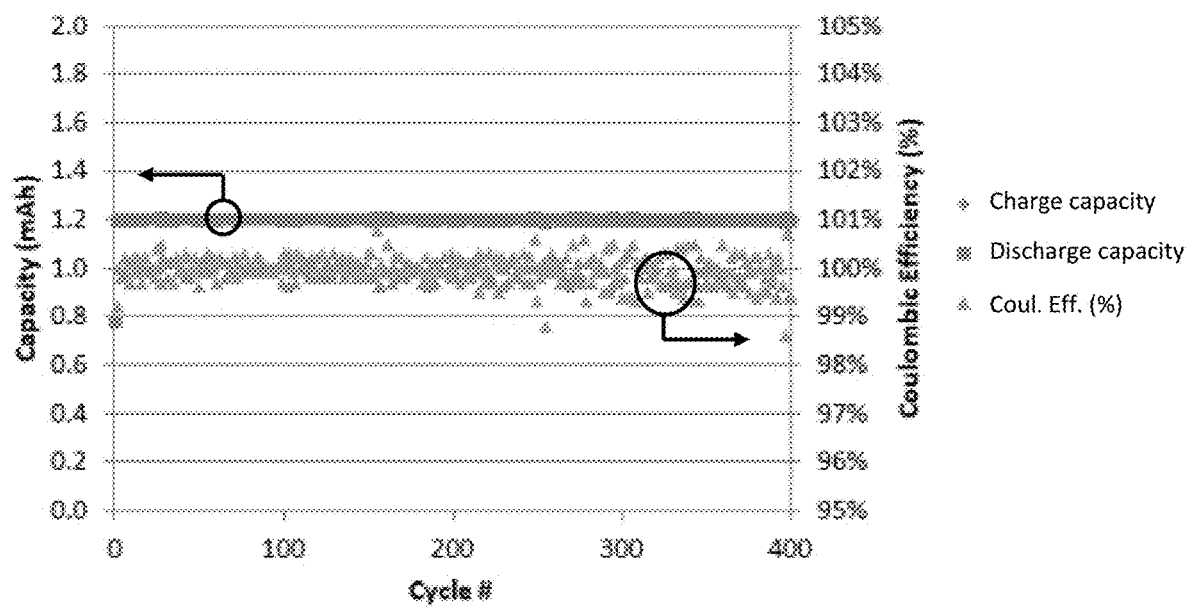
FIGS. 26A and 26B show the charge capacity and cycling stability at C/3 and 3C charging, respectively, of an example anode made according to an embodiment of the present disclosure.
Figure 26B:
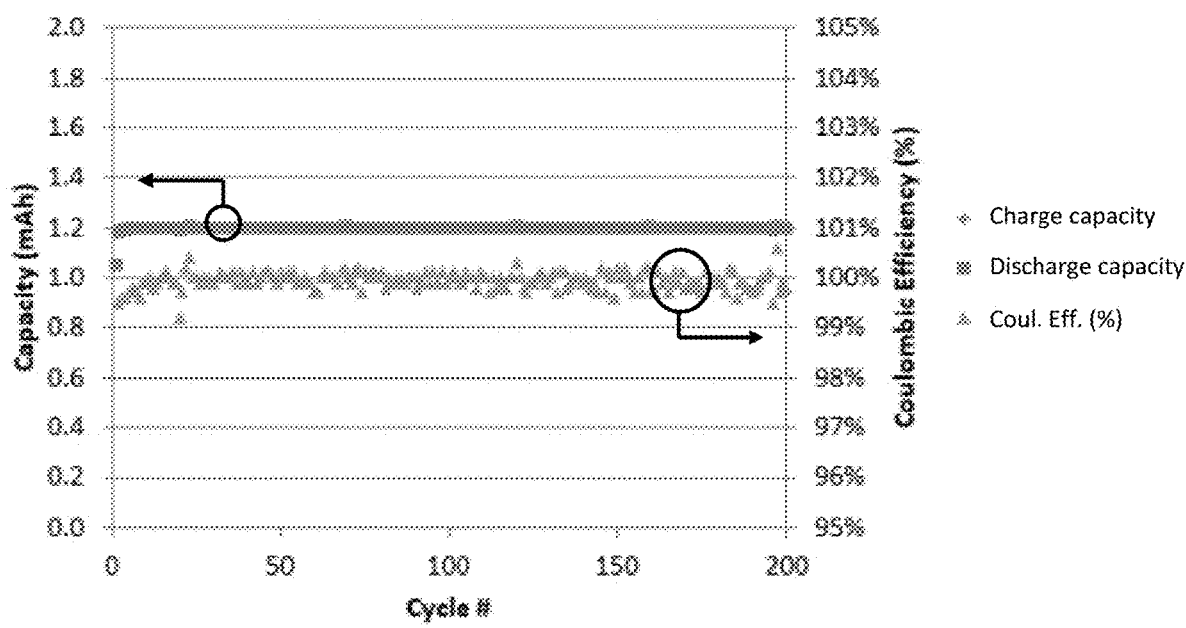

Half cells were constructed in a manner similar to that described previously. Formation protocol included 2-5 cycles at a current of ~C/20 to ~C/10. Cycling performance was tested using a conventional C/3 charge-discharge protocol and results are shown in FIG. 26A. Cycling performance was also tested using an aggressive 3C charge—C/3 discharge protocol and results are shown in FIG. 26B. For both figures, the charge and discharge capacity data are very similar causing the discharge capacity data points to largely cover the charge capacity data points. One can see the Example 3 Anodes are very stable, even under aggressive charging conditions. In contrast, without the metal oxide layer, most of the Comparative 3 anodes could not even be tested due to the poor coating. In a few isolated cases where a Comparative 3 Anode formed a sufficient layer of silicon, the anode quickly failed upon cycling or during formation.

Example 4

Example 4 Current Collector was prepared by placing a copper foil in a muffle furnace and the temperature quickly raised to 200° C. The furnace was held at 200° C. for 2 hours, then allowed to cool to room temperature, forming a copper oxide layer about 0.1 μm thick. Subsequently, approximately 50 nm of amorphous $TiO_2$ was deposited over the copper oxide using an ALD system. Thus, the metal oxide layer of this Example 4 Current Collector includes multiple sublayers of copper oxide and $TiO_2$. Comparative 4 Current Collector used the same copper foil but had no treatment other than a brief IPA or n-propanol wipe. Example 4 Anode was prepared by depositing amorphous silicon over Example 4 Current Collector using the same (HDPECVD) system as mentioned in Example 3. The thickness of the silicon layer was about 3.9 μm. Deposition onto Comparative 4 Current Collector resulted in unusable, poorly adhered, or non-adhered deposits (Comparative 4 Anode) that was not further tested.

Figure 27:
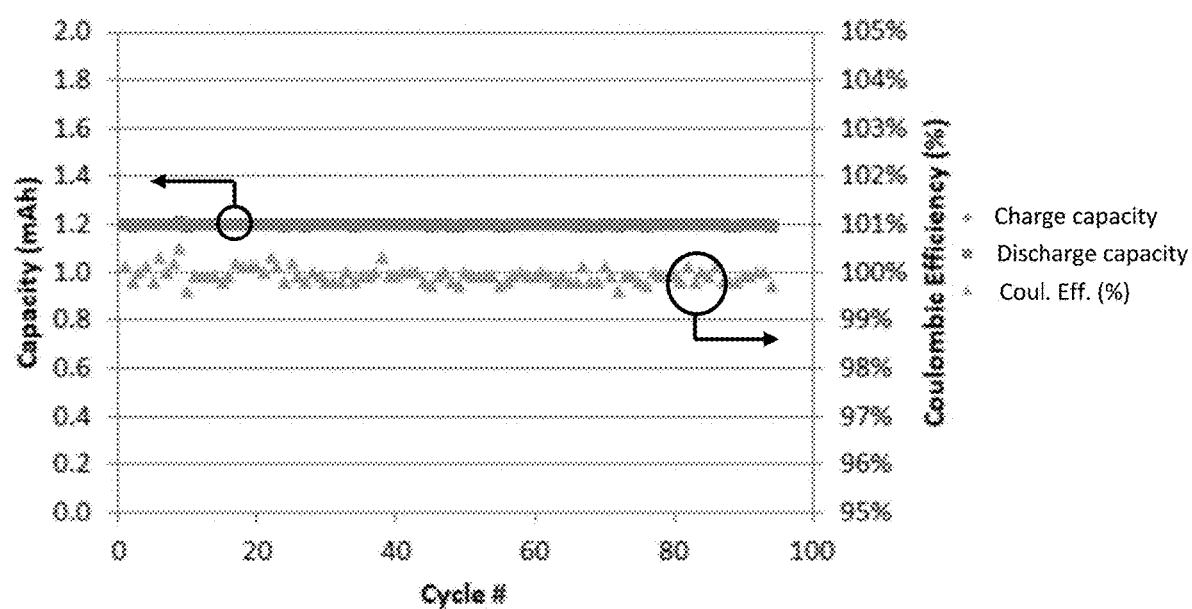
FIG. 27 shows the charge capacity and cycling stability at C/3 charging of an example anode made according to an embodiment of the present disclosure.

Half-cell construction and formation protocol was similar to that described in Example 3. Cycling performance was tested using C/3 charge-discharge protocol and results are shown in FIG. 27. As with Example 3, the charge and discharge capacity data are very similar causing the discharge capacity data points to largely cover the charge capacity data points. In any event, one can see the example anodes are very stable with continued cycling.

Despite the industry's advocation of micro- or nanostructured silicon or other lithium storage materials, it has been found in the present disclosure that highly effective anodes can be formed without such features. Although the present anodes have been discussed with reference to batteries, dome embodiments the present anodes may be used in hybrid capacitor devices. Relative to comparable micro- or nanostructured anodes, the anodes of the present disclosure may have one or more of the following unexpected advantages:
  comparable or improved stability at aggressive >1C charging rates;
  higher overall areal charge capacity;
  higher charge capacity per gram of total silicon;
  improved physical durability;
  simplified manufacturing process; and
  more reproducible manufacturing process.

Aspects of the Disclosure

In a first aspect, the disclosure provides an anode for an energy storage device comprising: an electrically conductive current collector comprising a metal oxide layer; and a continuous porous lithium storage layer provided over the metal oxide 5 layer, wherein the continuous porous lithium storage layer comprises at least 40 atomic % silicon, germanium or a combination thereof.

In a second aspect, the disclosure provides an anode of the first aspect, wherein the continuous porous lithium storage layer includes less than 10 atomic % carbon. In a third aspect, the disclosure provides an anode of the first aspect or the second aspect, wherein the continuous porous lithium storage layer is substantially free of nanowires, nanopillars and nanotubes.

In a fourth aspect, the disclosure provides an anode of the first aspect through the third aspect, wherein the continuous porous lithium storage layer includes less than 5% by weight of carbon-based binders, graphitic carbon, graphene, graphene oxide, carbon black and conductive carbon.

In a fifth aspect, the disclosure provides an anode of the first aspect through the fourth aspect, wherein a total reflectance is at least 10%, alternatively at least 15%, alternatively at least 20%, measured at 550 nm at a side having the continuous porous lithium storage layer. In a sixth aspect, the disclosure provides an anode of the first aspect through the fifth aspect, wherein the current collector further comprises an electrically conductive layer, and wherein the metal oxide layer is provided over the electrically conductive layer.

In a seventh aspect, the disclosure provides an anode of the sixth aspect, wherein the electrically conductive layer comprises stainless steel, titanium, nickel, or copper, or a combination thereof, and
  wherein the metal oxide layer comprises an oxide of nickel, an oxide of copper, an oxide of titanium or a combination thereof.

In an eight aspect, the disclosure provides an anode of the sixth aspect wherein, the metal oxide layer comprises an oxide of nickel or an oxide of titanium.

In a ninth aspect, the disclosure provides an anode of the first aspect through the eighth aspect, wherein the metal oxide layer has an average thickness of at least 0.02 μm, alternatively an average thickness of at least 0.05 μm, alternatively, an average thickness of about 0.1 μm, alternatively, an average thickness of at least 0.2 μm, alternatively, an average thickness of at least 0.5 μm.

In a tenth aspect, the disclosure provides an anode of the first aspect through the ninth aspect, wherein the metal oxide layer has an average thickness in a range of about 0.2 μm to about 10 μm., alternatively, an average thickness in a range of about 0.5 μm to about 5 μm. In an eleventh aspect, the disclosure provides an anode of the first aspect through the tenth aspect, wherein the continuous porous lithium storage layer comprises at least 40 atomic % amorphous silicon having areal density of at least 0.2 $mg/cm^2$, alternatively, an areal density of at least 0.3 $mg/cm^2$.

In a twelfth aspect, the disclosure provides an anode of the first aspect through the eleventh aspect, wherein the continuous porous lithium storage layer comprises at least 40 atomic % amorphous silicon having areal density in a range of about 0.2 $mg/cm^2$ to about 10 $mg/cm^2$, alternatively, an areal density in a range of about 0.3 $mg/cm^2$ to about 5 $mg/cm^2$. In a thirteenth aspect, the disclosure provides an anode of the first aspect through the twelfth aspect, wherein the continuous porous lithium storage layer comprises substantially no crystalline silicides.

In a fourteenth aspect, the disclosure provides an anode of the first aspect through the thirteenth aspect further comprising a supplemental layer provided over the lithium storage layer.

In a fifteenth aspect, the disclosure provides an anode of the fourteenth aspect, wherein the supplemental layer comprises an oxide, nitride or oxynitride of aluminum, titanium or vanadium.

In a sixteenth aspect, the disclosure provides an anode of the fourteenth aspect or the fifteenth aspect, wherein the supplemental layer comprises lithium, phosphorous or both.

In a seventeenth aspect, the disclosure provides an anode of the fourteenth aspect through the sixteenth aspect, wherein the supplemental layer is a solid-state electrolyte material.

In an eighteenth aspect, the disclosure provides an anode of the fourteenth aspect through the seventeenth aspect, wherein the supplemental layer has a lithium ion conductivity of at least $10_{-7}$ S/cm.

In a nineteenth aspect, the disclosure provides an anode of the first aspect through the eighteenth aspect, wherein after a formation step, the anode has a charge storage capacity of at least 0.5 mAh/cm$^2$.

In a twentieth aspect, the disclosure provides an anode of the first aspect through the nineteenth aspect, wherein the continuous porous lithium storage layer has an average thickness of at least 0.2 μm, alternatively, an average thickness of at least 0.5 μm, alternatively, an average thickness of at least 1.0 μm.

In a twenty-first aspect, the disclosure provides an anode of the first aspect through the twentieth aspect, wherein the continuous porous lithium storage layer has an average thickness in a range of about 0.5 μm to about 25 μm, alternatively, an average thickness in a range of about 2 μm to about 15 μm.

In a twenty-second aspect, the disclosure provides an anode of the first aspect through the twenty-first aspect, wherein a ratio of total to diffuse reflectance is greater than or equal to 1.05 over the 300-800 nm wavelength range measured at a side having the continuous porous lithium storage layer.

In a twenty-third aspect, the disclosure provides an anode of the first aspect through the twenty-second aspect, wherein a ratio of total to diffuse reflectance is greater than or equal to 1.1, alternatively greater than or equal to 1.15, measured at 550 nm at a side having the continuous porous lithium storage layer.

In a twenty-fourth aspect, the disclosure provides an anode of the first aspect through the twenty-third aspect, wherein a ratio of total to diffuse reflectance is greater than or equal to 1.05 at 550 nm wavelength measured at a side of the anode having the lithium storage layer.

In a twenty-fifth aspect, the disclosure provides an anode of the first aspect through the twenty-fourth aspect, wherein the continuous porous lithium storage layer has an average density of less than 2.3 g/cm$^3$ and comprises at least 40 atomic % amorphous silicon. In a twenty-sixth aspect, the disclosure provides an anode of the first aspect through the twenty-fifth aspect, wherein the continuous porous lithium storage layer has an average density in a range of about 1.1 g/cm$^3$ to about 2.25 g/cm$^3$ and comprises at least 40 atomic % amorphous silicon.

In a twenty-seventh aspect, the disclosure provides an anode of the first aspect through the twenty-sixth aspect, wherein the continuous porous lithium storage layer has an average density in a range of about 1.4 g/cm$^3$ to about 2.2 g/cm$^3$ and comprises at least 40 atomic % amorphous silicon.

In a twenty-eighth aspect, the disclosure provides an anode of the first aspect through the twenty-seventh aspect, wherein the continuous porous lithium storage layer has an average density in a range of about 1.6 g/cm$^3$ to about 2.1 g/cm$^3$ and comprises at least 40 atomic % amorphous silicon.

In a twenty-ninth aspect, the disclosure provides an anode of the first aspect through the twenty-eighth aspect wherein at least a portion of a total reflectance spectrum measured in a range of 700 to 15,000 nm at a side having the lithium storage layer includes an interference pattern of multiple peaks.

In a thirtieth aspect, the disclosure provides a battery comprising an anode of the first aspect through the twenty-ninth aspect.

In a thirty-first aspect, the disclosure provides a method of making an anode for use in an energy storage device comprising: providing an electrically conductive current collector comprising an electrically conductive layer and a metal oxide layer provided over the electrically conductive layer, wherein the metal oxide layer has an average thickness of at least 0.1 μm; and depositing a continuous porous lithium storage layer onto the metal oxide layer by PECVD, wherein the continuous porous lithium storage layer comprises at least 40 atomic % silicon, germanium or a combination thereof.

In a thirty-second aspect, the disclosure provides a method of the thirty-first aspect, wherein the electrically conductive layer comprises stainless steel, nickel, copper or titanium.

In a thirty-third aspect, the disclosure provides a method of the thirty-5 first aspect or thirty-second aspect, wherein the electrically conductive layer is in the form of a metal foil or metal mesh.

In a thirty-fourth aspect, the disclosure provides a method of the thirty-first aspect through the thirty-third aspect, wherein the electrically conductive layer comprises a first metal and the metal oxide layer comprises the same metal as the first metal. In a thirty-fifth aspect, the disclosure provides a method of the thirty-first aspect through the thirty-fourth aspect, wherein the electrically conductive layer comprises metallic nickel and the metal oxide layer comprises an oxide of nickel.

In a thirty-sixth aspect, the disclosure provides a method of the thirty-first aspect through the thirty-fifth aspect, wherein the metal oxide layer is provided by oxidation of a metal foil, metal mesh or metal layer.

In a thirty-seventh aspect, the disclosure provides a method of the thirty-sixth aspect, wherein the oxidation comprises exposing a foil, mesh or layer comprising nickel to an oxygen-containing atmosphere at a temperature of at least 300° C.

In a thirty-eighth aspect, the disclosure provides a method of the thirty-first aspect through the thirty-fifth aspect, wherein the metal oxide layer is provided by chemical vapor deposition.

In a thirty-ninth aspect, the disclosure provides a method of the thirty-eighth aspect, wherein the metal oxide layer comprises an oxide of titanium.

In a fortieth aspect, the disclosure provides a method of the thirty-first aspect through the thirty-ninth aspect, wherein metal oxide layer has an average thickness of at least 0.02 μm, alternatively an average thickness of at least 0.05 μm, alternatively, an average thickness of about 0.1 μm, alternatively, an average thickness of at least 0.2 µm, alternatively, an average thickness of at least 0.5 µm.

The invention claimed is:

1. An anode for an energy storage device comprising:
   an electrically conductive current collector comprising an electrically conductive layer and a transition metal oxide layer overlaying the electrically conductive layer; and
   a continuous porous lithium storage layer overlaying the transition metal oxide layer, wherein the continuous porous lithium storage layer comprises at least 40 atomic % amorphous silicon.

2. The anode of claim 1, wherein the electrically conductive layer is in the form of a metal mesh.

3. The anode of claim 1, wherein the electrically conductive layer comprises two or more sublayers differing in chemical composition.

4. The anode of claim 3, wherein one electrically conductive sublayer comprises copper and another electrically conductive sublayer comprises nickel.

5. The anode of claim 4, wherein the nickel sublayer is interposed between the copper sublayer and the transition metal oxide layer.

6. The anode of claim 1, wherein the transition metal oxide layer comprises two or more metal oxide sublayers differing in chemical composition.

7. The anode of claim 6, wherein one metal oxide sublayer comprises titanium dioxide.

8. The anode of claim 1, wherein the electrically conductive layer comprises stainless steel.

9. The anode of claim 1, wherein the electrically conductive layer comprises nickel.

10. The anode of claim 1, wherein the electrically conductive layer comprises copper.

11. The anode of claim 1, wherein the transition metal oxide layer comprises an oxide of titanium.

12. The anode of claim 1, wherein the transition metal oxide layer comprises an oxide of nickel.

13. The anode of claim 1, wherein the transition metal oxide layer has an average thickness of at least 0.05 µm.

14. The anode of claim 1, wherein the amorphous silicon has an area density of at least 0.3 mg/cm$^2$.

15. The anode of claim 1, further comprising a supplemental layer provided over the continuous porous lithium storage layer, wherein the supplemental layer comprises an oxide, nitride, or oxynitride of aluminum, titanium, or vanadium.

16. The anode of claim 1, wherein the continuous porous lithium storage layer has an average density of less than 2.3 g/cm$^3$.

17. A battery comprising the anode of claim 1.

18. The battery of claim 17, wherein after a formation step, the anode has a charge storage capacity of at least 0.5 mAh/cm$^2$.

19. The battery of claim 18, wherein the anode is a capable of charging at 3C and discharging at C/3 for 200 cycles without failing.

* * * * *